(12) United States Patent
Wu et al.

(10) Patent No.: US 11,494,595 B2
(45) Date of Patent: Nov. 8, 2022

(54) METHOD, APPARATUS, AND STORAGE MEDIUM FOR ANNOTATING IMAGE

(71) Applicant: TENCENT TECHNOLOGY (SHENZHEN) COMPANY LIMITED, Shenzhen (CN)

(72) Inventors: Baoyuan Wu, Shenzhen (CN); Weidong Chen, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/917,430

(22) Filed: Jun. 30, 2020

(65) Prior Publication Data

US 2020/0334493 A1  Oct. 22, 2020

Related U.S. Application Data

(63) Continuation of application No. PCT/CN2019/086372, filed on May 10, 2019.

(30) Foreign Application Priority Data

Jun. 15, 2018 (CN) .......................... 201810622626.4

(51) Int. Cl.
*G06K 9/62* (2006.01)
*G06K 9/46* (2006.01)

(52) U.S. Cl.
CPC .............. *G06K 9/627* (2013.01); *G06K 9/46* (2013.01); *G06K 9/6256* (2013.01); *G06K 9/6262* (2013.01)

(58) Field of Classification Search
CPC ................................. G06K 9/46; G06K 9/6262
See application file for complete search history.

(56) References Cited

U.S. PATENT DOCUMENTS

2015/0120760 A1*  4/2015  Wang .................. G06K 9/6263
                                                    707/749
2017/0365038 A1   12/2017  Denton et al.

FOREIGN PATENT DOCUMENTS

CN        105389326 A        3/2016
CN        106599051 A        9/2017
                (Continued)

OTHER PUBLICATIONS

Wu et al., "Tagging like Humans: Diverse and Distinct Image Annotation," arXiv:1804.00113v1 [cs.CV] Mar. 31, 2018 (Year: 2018).*

(Continued)

*Primary Examiner* — Ross Varndell
(74) *Attorney, Agent, or Firm* — Crowell & Moring LLP

(57) ABSTRACT

The present disclosure describes a method, apparatus, and storage medium for annotating image. The method includes extracting, by a device, a visual feature of an image through a generative adversarial network model, and sequentially inputting M pieces of random noise into the generative adversarial network model. In response to each of the M pieces of random noise being inputted into the generative adversarial network model, the method includes performing a determinantal point process (DPP) on the visual feature of the image and the each random noise through the generative adversarial network model to obtain N tag subsets, and selecting a distinct tag subset from the N tag subsets through the generative adversarial network model. The method also includes outputting M distinct tag subsets through the generative adversarial network model after the M pieces of random noise are inputted into the generative adversarial network model.

18 Claims, 11 Drawing Sheets

(56) References Cited

FOREIGN PATENT DOCUMENTS

| CN | 107169530 A | 9/2017 |
|---|---|---|
| CN | 107330444 | 11/2017 |
| CN | 107622104 | 1/2018 |

OTHER PUBLICATIONS

International Search Report issued in PCT/CN2019/086372 dated Jul. 30, 2019, with English translation.
Wu et al., "Tagging like Humans: Diverse and Distinct Image Annotation," https://arxiv.org!abs/1804.00113, Mar. 31, 2018 (Mar. 31, 2018), pp. 1-9.
Chinese Office Action with English concise explanation of relevance regarding 201810622626.4 dated Sep. 29, 2022, 9 pages.

* cited by examiner

METHOD, APPARATUS, AND STORAGE MEDIUM FOR ANNOTATING IMAGE

RELATED APPLICATION

This application is a continuation application of PCT Patent Application No. PCT/CN2019/086372, filed on May 10, 2019, which claims priority to Chinese Patent Application No. 201810622626.4, filed with the National Intellectual Property Administration, P.R. China on Jun. 15, 2018, both of which are incorporated herein by reference in their entireties.

FIELD OF THE TECHNOLOGY

This application relates to the field of image annotation technologies, and in particular, to an image annotation method and apparatus.

BACKGROUND OF THE DISCLOSURE

In automatic image annotation, as much image information as possible needs to be represented by using a small quantity of tags, in which a semantic relationship between tags is fully used, so that a result of automatic annotation is similar to a result of manual annotation.

In the related art, a diverse image annotation (DIA) algorithm is provided for implementing image annotation. An objective of the DIA algorithm is to generate a tag subset, and describe an image by using a limited quantity of tags. The DIA algorithm selects a proper semantic connection path by further exploring a semantic hierarchy and a synonym in candidate tags. That is, during tag selection, similar semantic meanings are discarded when the same image is annotated, to prevent the similar semantic meanings from occurring simultaneously. Therefore, the used tags need to cover as much useful information as possible. Compared with a conventional image annotation task, the DIA algorithm requires tags to be representative information of the image and associated with each other, to reduce redundancy.

Although the DIA algorithm provided in the related art reduces redundancy, a description of the image is one-sided, and a semantic meaning of the image cannot be accurately expressed.

SUMMARY

Embodiments of this application provide an image annotation method and apparatus, which are configured to extract diverse and distinct tag subsets, to implement a comprehensive description of an image.

The present disclosure describes a method for annotating image. The method includes extracting, by a device, a visual feature of an image from the image through a generative adversarial network model. The device includes a memory storing instructions and a processor in communication with the memory. The method also includes sequentially inputting, by the device, M pieces of random noise into the generative adversarial network model, M being a positive integer. In response to each of the M pieces of random noise being inputted into the generative adversarial network model, the method further includes performing, by the device, a determinantal point process (DPP) on the visual feature of the image and the each random noise through the generative adversarial network model to obtain N tag subsets, N being a positive integer, and selecting, by the device, a distinct tag subset from the N tag subsets through the generative adversarial network model. The method also includes outputting, by the device, M distinct tag subsets through the generative adversarial network model after the M pieces of random noise are inputted into the generative adversarial network model, the M distinct tag subsets being diverse from each other.

The present disclosure describes an apparatus for annotating image. The apparatus includes a memory storing instructions; and a processor in communication with the memory. When the processor executes the instructions, the processor is configured to cause the apparatus to extract a visual feature of an image from the image through a generative adversarial network model, and sequentially input M pieces of random noise into the generative adversarial network model, M being a positive integer. In response to each of the M pieces of random noise being inputted into the generative adversarial network model, the processor is configured to cause the apparatus to perform a determinantal point process (DPP) on the visual feature of the image and the each random noise through the generative adversarial network model to obtain N tag subsets, N being a positive integer, and select a distinct tag subset from the N tag subsets through the generative adversarial network model. When the processor executes the instructions, the processor is configured to cause the apparatus to output M distinct tag subsets through the generative adversarial network model after the M pieces of random noise are inputted into the generative adversarial network model, the M distinct tag subsets being diverse from each other.

The present disclosure describes a non-transitory computer readable storage medium storing computer readable instructions. The computer readable instructions, when executed by a processor, are configured to cause the processor to perform extracting a visual feature of an image from the image through a generative adversarial network model; sequentially inputting M pieces of random noise into the generative adversarial network model, M being a positive integer; in response to each of the M pieces of random noise being inputted into the generative adversarial network model: performing a determinantal point process (DPP) on the visual feature of the image and the each random noise through the generative adversarial network model to obtain N tag subsets, N being a positive integer, and selecting a distinct tag subset from the N tag subsets through the generative adversarial network model; and outputting M distinct tag subsets through the generative adversarial network model after the M pieces of random noise are inputted into the generative adversarial network model, the M distinct tag subsets being diverse from each other.

The embodiments of this application provide the following technical solutions:

According to one aspect, an embodiment of this application provides an image annotation method, including:

extracting, by a terminal, a visual feature of a to-be-annotated image from the to-be-annotated image through a generative adversarial network;

sequentially inputting, by the terminal, M pieces of random noise into the generative adversarial network model, M being a positive integer;

performing, by the terminal in a case that a single piece of random noise is inputted into the generative adversarial network model, determinantal point process (DPP) processing on the visual feature and the single piece of random noise through the generative adversarial network model, to obtain N randomly selected tag subsets, and selecting one distinct tag subset from the N randomly selected tag subsets through the generative adversarial network model, N being a positive integer; and outputting, by the terminal, M distinct tag subsets through the generative adversarial network model after the M pieces of random noise are inputted into the generative adversarial network model, the M tag subsets being diverse from each other.

According to another aspect, an embodiment of this application further provides an image annotation apparatus, installed in a terminal, the apparatus including:

a feature extraction module, configured to extract a visual feature of a to-be-annotated image from the to-be-annotated image through a generative adversarial network;

a noise input module, configured to sequentially input M pieces of random noise into the generative adversarial network model, M being a positive integer;

a distinct tag generation module, configured to perform, in a case that a single piece of random noise is inputted into the generative adversarial network model, determinantal point process (DPP) processing on the visual feature and the single piece of random noise through the generative adversarial network model, to obtain N randomly selected tag subsets, and select one distinct tag subset from the N randomly selected tag subsets through the generative adversarial network model, N being a positive integer; and a diverse tag generation module, configured to output M distinct tag subsets through the generative adversarial network model after the M pieces of random noise are inputted into the generative adversarial network model, the M tag subsets being diverse from each other.

In the foregoing aspect, the composition modules of the image annotation apparatus may further perform steps described in the foregoing aspect and various possible implementations. For details, refer to the foregoing descriptions of the foregoing aspect and various possible implementations.

According to another aspect, an embodiment of this application provides an image annotation apparatus, including: a processor and a memory, the memory being configured to store an instruction, and the processor being configured to execute the instruction in the memory, so that the image annotation apparatus performs the method according to any one of the foregoing aspects.

According to another aspect, an embodiment of this application provides a computer-readable storage medium, the computer-readable storage medium storing an instruction, the instruction, when run on a computer, causing the computer to perform the method according to the foregoing aspects.

In the embodiments of this application, a visual feature of a to-be-annotated image is first extracted from the to-be-annotated image through a generative adversarial network; M pieces of random noise are sequentially inputted into the generative adversarial network model; in a case that a single piece of random noise is inputted into the generative adversarial network model, determinantal point process (DPP) processing is performed on the visual feature and the single piece of random noise through the generative adversarial network model, to obtain N randomly selected tag subsets, and one distinct tag subset is selected from the N randomly selected tag subsets through the generative adversarial network model. M distinct tag subsets are outputted through the generative adversarial network model after the M pieces of random noise are inputted into the generative adversarial network model, the M tag subsets being diverse from each other. In the embodiments of this application, DPP processing may be performed on a visual feature of an image and a single piece of random noise, to output N randomly selected tag subsets, and one distinct tag subset may be selected from the N tag subsets. In a case that M pieces of random noise are inputted into a generative adversarial network model, distinct tag subsets respectively corresponding to each piece of random noise may be outputted. Therefore, a plurality of diverse and distinct tag subsets are finally generated, thus achieving a human-like image annotation effect and implementing a comprehensive description of the image.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person skilled in the art may still derive other drawings from these accompanying drawings.

FIG. 8-$b$ is a schematic structural diagram of compositions of another image annotation apparatus according to an embodiment of this application.

FIG. 8-$c$ is a schematic structural diagram of compositions of a model training module according to an embodiment of this application.

FIG. 8-$d$ is a schematic structural diagram of compositions of a policy function obtaining unit according to an embodiment of this application.

FIG. 8-$e$ is a schematic structural diagram of compositions of a discrimination unit according to an embodiment of this application.

FIG. 8-$f$ is a schematic structural diagram of compositions of a distinct tag generation module according to an embodiment of this application.

DESCRIPTION OF EMBODIMENTS

Figure 1:
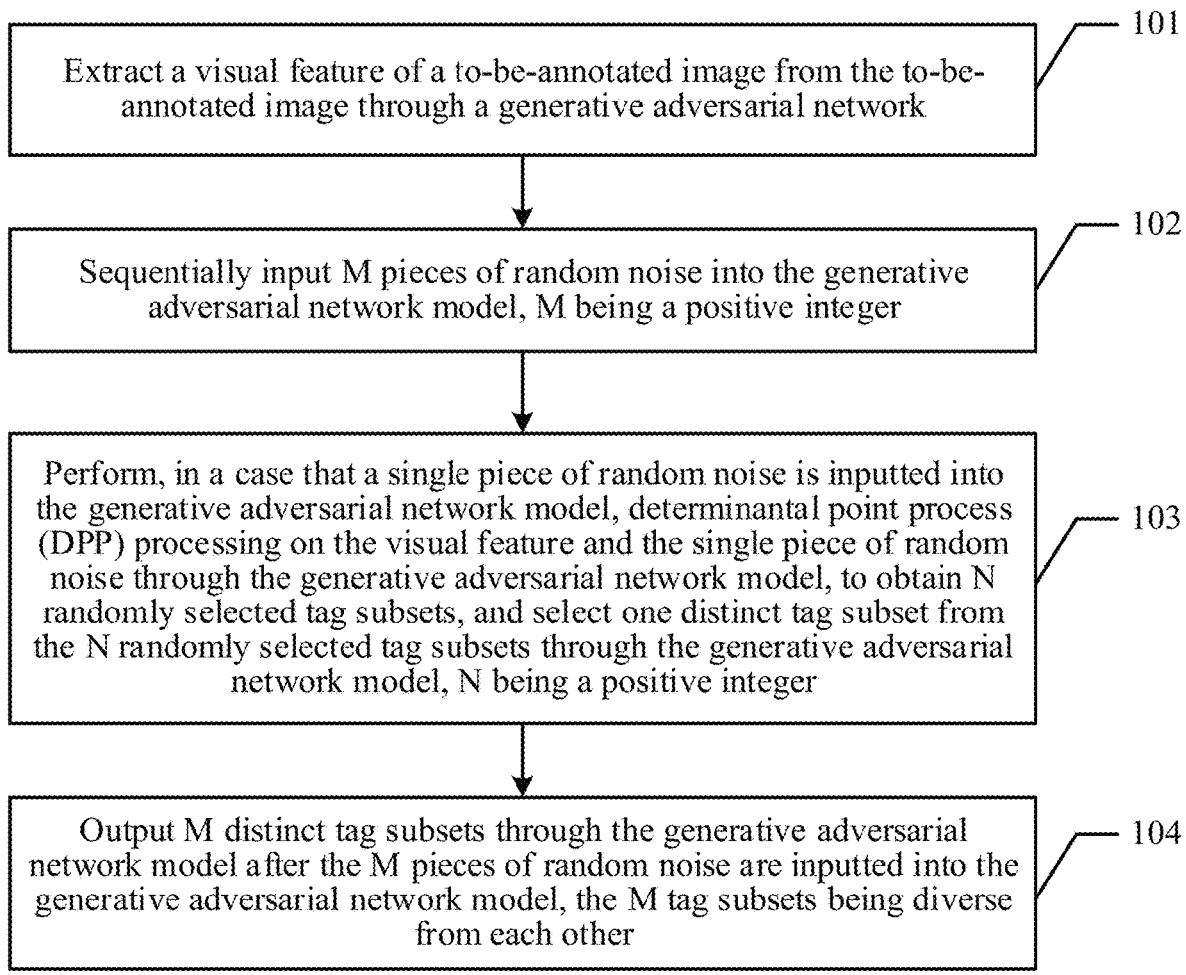
FIG. 1 is a schematic block flowchart of an image annotation method according to an embodiment of this application.

Embodiments of this application provide an image annotation method and apparatus, which are configured to extract diverse and distinct tag subsets, to implement a comprehensive description of an image.

To make the application objectives, features, and advantages of this application clearer and more comprehensible, the following clearly and completely describes the technical solutions in the embodiments of this application with reference to the accompanying drawings in the embodiments of this application. Apparently, the described embodiments are merely some but not all of the embodiments of this application. All other embodiments obtained by a person skilled in the art based on the embodiments of this application shall fall within the protection scope of this application.

The terms "include", "contain" and any other variants thereof in the specification, claims, and accompanying drawings of this application are intended to cover a non-exclusive inclusion, so that a process, a method, a system, a product, or a device that includes a series of units is not necessarily limited to those units, but may include other units not expressly listed or inherent to such a process, method, product, or device.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Unless defined otherwise, all technical and scientific terms used herein have the same meaning as commonly understood by one of skill in the art to which the disclosure pertains. Although any methods and materials similar to or equivalent to those described herein may be used in the practice or testing of the present disclosure, the preferred methods and materials are described herein.

Detailed descriptions are separately provided below.

An embodiment of this application mainly provides an image annotation method. In this embodiment of this application, a plurality of diverse and distinct tag subsets are annotated on an image through a generative adversarial network model. The generative adversarial network model provided in this embodiment of this application has a diverse and distinct image annotation (D2IA) function. The generative adversarial network model is inspired by a result of manual image annotation, and defines a new automatic image annotation task, so that a result of automatic annotation is more similar to a result of manual annotation. A plurality of diverse and distinct tag subsets may be outputted based on the generative adversarial network model trained in this embodiment of this application, thus achieving a human-like image annotation effect and implementing a comprehensive description on the image.

Referring to FIG. 1, an image annotation method provided by an embodiment of this application may include the following steps:

101. A terminal extracts a visual feature of a to-be-annotated image from the to-be-annotated image through a generative adversarial network.

In this embodiment of this application, the to-be-annotated image is an image for which a tag subset needs to be generated. The image may be an image inputted by a user through the terminal, or may be an image automatically acquired by the terminal. For example, after capturing an image through a camera, the terminal inputs the image into a generative adversarial network model provided by this embodiment of this application.

In this embodiment of this application, the generative adversarial network model needs to be trained in advance. The generative adversarial network model has a D2IA function. After obtaining the to-be-annotated image, the terminal inputs the image into the generative adversarial network model. The generative adversarial network model has a feature extraction function. For example, the generative adversarial network model includes a convolutional neural network (CNN). The visual feature of the image may be extracted from the to-be-annotated image through the CNN, and the visual feature may be represented by a feature vector. The visual feature extracted by the generative adversarial network model in this embodiment of this application may include other extracted features, which are not limited to a CNN feature. For example, the visual feature may alternatively include a scale invariant feature.

102. The terminal sequentially inputs M pieces of random noise into the generative adversarial network model, M being a positive integer.

In this embodiment of this application, a plurality of pieces of random noise further need to be sequentially inputted into the generative adversarial network model. For example, a letter M is used for representing the quantity of pieces of noise inputted into the generative adversarial network model, and a value of M may be a value equal to or greater than 2, which is not limited herein.

In this embodiment of this application, the random noise inputted into the generative adversarial network model may be combined/mixed with the visual feature of the image. The pieces of random noise inputted sequentially are respectively mixed with the visual feature of the image. For example, after one piece of random noise is introduced into the generative adversarial network model, with reference to the visual feature of the inputted image, the terminal may combine/mix the random noise with the visual feature through the generative adversarial network model. The plurality of pieces of random noise inputted into the generative adversarial network model may be respectively mixed with the visual feature of the same image.

In this embodiment of this application, the random noise is noise that is caused by accumulations of a large amount of randomly generated fluctuations and harassment in time and that has an unpredictable value at a given moment. Inputting random noise into the generative adversarial network model may be implemented by randomly disturbing the visual feature in the generative adversarial network model. A random disturbance term is an error caused by uncertainty of data. Generally, it is assumed that a random disturbance term is independent and conforms to normal distribution with an average value of 0 and equal variances. Random disturbance is added to the generative adversarial network model, and then an operation of generating a distinct tag subset in step 103 is performed.

103. The terminal performs, in a case that a single piece of random noise is inputted into the generative adversarial network model, determinantal point process (DPP) processing on the visual feature and the single piece of random noise through the generative adversarial network model, to obtain N randomly selected tag subsets, and selects one distinct tag subset from the N randomly selected tag subsets through the generative adversarial network model, N being a positive integer.

In this embodiment of this application, each time random noise is inputted into the generative adversarial network model, step 103 may be performed once. When the M pieces of random noise are sequentially inputted into the generative adversarial network model, step 103 needs to be performed M times.

In step 103, the terminal first performs DPP processing on the single piece of random noise and the visual feature of the image, and then performs sampling, to generate a distinct tag subset. Distinctness means that a rule is complied with, so that semantic redundancy between tags is avoided. That is, tags are semantically distinct, and there is no semantic redundancy. In this embodiment of this application, the DPP processing performed based on the generative adversarial network model may be a conditional determinantal point process (cDPP) in which an image is used as a condition.

In this embodiment of this application, the generative adversarial network model may complete the DPP processing on the single piece of random noise and the visual feature through a DPP model in the generative adversarial network model. For example, a sequence whose length is N is provided, in which each element is randomly obtained from a universal set I equiprobably. It is assumed that S={0, 1, 2, 3 . . . 9}. Then, for the sequence whose length is N, if, from the second position, a number of a current position is less than a previous number, this subscript is selected, so that each sequence whose length is N corresponds to a subset: I={1 . . . N}. For an appearance probability of each subset, there is a determinant reflecting a probability that any subset is selected. Several determinantal principal minors of this determinant exactly correspond to the probability that a subset is selected. The procedure is referred to as a determinantal process. Through the DPP processing, a feature with a high quality and high diversity may be selected.

In this embodiment of this application, after completing the DPP processing through the generative adversarial network model, the terminal may output a plurality of randomly selected tag subsets. For example, a letter N is used for representing the quantity of the randomly selected tag subsets. A value of N is, for example, 10. In this embodiment of this application, a DPP model may be set in the generative adversarial network model. The DPP model is a probability model. Sampling performed according to the probability model has randomness. Therefore, a plurality of different tag subsets may be generated.

After the terminal completes the DPP processing through the generative adversarial network model, the generative adversarial network model may output N randomly selected tag subsets, and perform sampling based on the N tag subsets, to select one distinct tag subset from the N tag subsets. That is, in this embodiment of this application, all tags in the tag subset selected through the generative adversarial network model are semantically distinct from each other, and there is no semantic redundancy.

In some embodiments of this application, the generative adversarial network model may specifically use a weighted semantic path (WSP) to complete sampling on the N tag subsets. The WSP is based on a semantic hierarchical relationship and synonyms between tags, and both the semantic hierarchical relationship and the synonyms may be obtained from WordNet. A basic construction process of the WSP is as follows: (1) tracing upwards, for each node at a bottom layer (that is, a leaf node) in a semantic hierarchical relationship diagram, to find a path to a node at the top layer (that is, a root node), and combining two parent nodes into one node if the two parent nodes are synonymous; (2) calculating, for one path, a weight of each node according to a layer at which each node is located and the quantity of all subnodes of the node in the semantic hierarchical relationship diagram. A basic idea is that, if information expressed by the node is more precise, that is, if the amount of information is larger, the weight is greater.

In some embodiments of this application, that the terminal performs DPP processing on the visual feature and the single piece of random noise through the generative adversarial network model, to obtain N randomly selected tag subsets in step 103 includes:

concatenating, by the terminal, a feature vector corresponding to the visual feature and a noise vector corresponding to the single piece of random noise, to obtain a concatenated hybrid vector;

obtaining, by the terminal according to a candidate tag set, a correlation function unrelated to the visual feature;

performing, by the terminal, DPP processing on the correlation function and the hybrid vector through the generative adversarial network model, to obtain a probability distribution function;

performing, by the terminal, sequential sampling according to the probability distribution function, to obtain a current tag;

determining, by the terminal by using a weighted semantic path (WSP), whether the current tag and a sampled tag that is obtained before current sampling are from the same semantic path;

in a case that the current tag and the sampled tag are from the same semantic path, discarding, by the terminal, the current tag and performing sampling again; and in a case that the current tag and the sampled tag are not from the same semantic path, reserving, by the terminal, the current tag and sampling a next tag;

performing, by the terminal, the above steps of performing sampling until a quantity of reserved tags obtained through sampling reaches a maximum tag quantity of a tag subset; and continuing, by the terminal, to perform sampling in a case that the quantity of tags obtained through sampling reaches the maximum tag quantity of the tag subset, until the N tag subsets are collected.

The terminal first concatenates a feature vector and a noise vector. That is, the noise vector and the feature vector are mixed into one vector, which is defined as a hybrid vector. Then, the terminal obtains a correlation function independent of the visual feature of the image, and performs DPP processing on the correlation function and the hybrid vector through the generative adversarial network model, to obtain a probability distribution function. The probability distribution function may be a DPP probability distribution. Then, the terminal performs sequential sampling according to the probability distribution function. In addition, during each sampling operation, the terminal determines, by using the WSP, whether a current tag newly obtained through sampling and a sampled tag are from the same semantic path. If so, the terminal discards the current tag and performs sampling again; otherwise, the terminal reserves the current tag and samples a next tag until a quantity of tags obtained through sampling reaches a maximum tag quantity of a tag subset. In a case that the quantity of tags obtained through sampling reaches the maximum tag quantity of a tag subset, the terminal repeats the foregoing sampling procedure to continue sampling until the N tag subsets are collected. A value of N may be, for example, 10.

In some embodiments of this application, that the terminal selects one distinct tag subset from the N randomly selected tag subsets through the generative adversarial network model in step 103 includes:

respectively calculating, by the terminal, a sum of weights corresponding to all tags in each tag subset in the N tag subsets by using the WSP, to obtain total tag weights respectively corresponding to the N tag subsets; and selecting, by the terminal, a tag subset with a maximum weight as the distinct tag subset according to the total tag weights respectively corresponding to the N tag subsets.

In the generative adversarial network model, sampling is performed by using the WSP, to ensure that two tags from the same semantic path are simultaneously selected in the sampling procedure. In addition, for the plurality of tag subsets obtained through sampling, a sum of weights of tags in each tag subset is calculated, and a tag subset with a maximum weight is selected as a final output. For example, for the plurality of tag subsets obtained through DPP sampling, a sum of weights of tags in each tag subset is calculated, and a tag subset with a maximum weight is selected as a final output. Through the foregoing sampling procedure, one distinct tag subset may be generated.

In some embodiments of this application, the generative adversarial network model includes a generative network model and an adversarial network model. The generative network model may be alternatively referred to as a generator, and the adversarial network model may be alternatively referred to as a discriminator. In this embodiment of this application, the generative adversarial network model is trained in the following manner. Before step 101 in which a terminal extracts a visual feature of a to-be-annotated image from the to-be-annotated image through a generative adversarial network, the method provided in this embodiment of this application may include the following steps:

the terminal obtains a sample image from a sample database;

the terminal extracts a sample visual feature from the sample image through the generative network model;

the terminal performs DPP processing on the sample visual feature and a single piece of random noise through the generative network model, to obtain N randomly selected sample tag subsets;

the terminal selects one distinct sample tag subset from the N sample tag subsets through the generative network model; and the terminal performs alternate training on the generative network model and the adversarial network model by using the distinct sample tag subset and the sample visual feature of the sample image.

In this embodiment of this application, a sample database may be set for training and discrimination of the generative adversarial network model. The sample database may include a plurality of sample images. For each sample image, a tag subset used by a person for annotating the sample image may be obtained in advance. Extraction of the visual feature of the sample image is similar to the description in the foregoing step 101, in which the sample visual feature may be extracted through the generative network model. The generative network model may process the sample visual feature and the single piece of random noise according to the DPP processing manner in step 103, to obtain N sample tag subsets. Then, the generative network model may select one distinct sample tag subset according to the sampling manner in step 103. For example, the sampling manner of the generative network model may be the WSP. After the distinct sample tag subset is obtained, alternate training is performed on the generative network model and the adversarial network model based on the sample tag subset and the sample visual feature of the sample image. For an alternate training manner of the models, refer to the illustration in the following embodiments. Model configurations and training manner of the generative network model and the adversarial network model are described in the following.

In some embodiments of this application, that the terminal performs alternate training on the generative network model and the adversarial network model by using the sample tag subset and the sample visual feature of the sample image includes:

obtaining, by the terminal in current training of the generative network model, a sampled tag outputted by the generative network model in previous training;

obtaining, by the terminal through a reinforcement learning algorithm, a policy function used for measuring a possibility that the generative network model outputs a next tag based on the sample image and the sampled tag;

updating, by the terminal, the generative network model according to a gradient value of the policy function;

obtaining, by the terminal in current training of the adversarial network model, a distinct sample tag subset outputted by the generative network model on which the current training is completed; and performing, by the terminal, discrimination on the sample tag subset and the sample visual feature through the adversarial network model, and outputting a discrimination result.

The generative network model and the adversarial network model are alternately trained. Using one training procedure (that is, the current training procedure) as an example, the generative network model is first trained under the circumstance of a given adversarial network model. In the current training of the generative network model, a sampled tag outputted by the generative network model in previous training is obtained. A policy gradient (PG) function in the reinforcement learning algorithm is used. A discrete sampling procedure, considered as a sequence generation procedure, is controlled by a continuous policy function. The policy function may measure a possibility that a next tag is selected based on the image and the sampled tag. To simplify calculation, derivation may be performed on the policy function, to obtain a gradient value of the policy function. By using this gradient value, the generative network model may be updated by using a directional propagation algorithm and a stochastic gradient descent algorithm.

After the current training of the generative network model is completed, the terminal trains the adversarial network model under the circumstance of the given generative network model. In current training of the adversarial network model, a distinct sample tag subset outputted by the adversarial network model on which the current training is completed is obtained. That is, the currently updated adversarial network model may output one distinct sample tag subset again. Discrimination is performed on the sample tag subset and the sample visual feature through the adversarial network model, and a discrimination result is outputted. For example, whether the sample tag subset and the sample visual feature are the same may be calculated through a sigmoid function. If the sample tag subset and the sample visual feature are related, an output result is 1. If the sample tag subset and the sample visual feature are uncorrelated, the output result is 0.

In some embodiments of this application, that the terminal obtains, through a reinforcement learning algorithm, a policy function used for measuring a possibility that the generative network model outputs a next tag based on the sample image and the sampled tag includes:

determining, by the terminal, a correlation function between the sampled tag and the sample image through the generative network model;

obtaining, by the terminal, a timely incentive function according to the correlation function between the sampled tag and the sample image; and obtaining, by the terminal, the policy function according to the timely incentive function and a marginal probability of selecting the next tag.

After obtaining the sampled tag, the terminal first calculates the correlation function that is determined through the generative network model and that is between the sampled tag and the sample image. The correlation function is a correlation matrix independent of the sample image. A timely incentive function is calculated according to the correlation function. In one implementation, the timely incentive function may include a timely reward function. In another implementation, the timely reward function encourages content of the sample image to be highly correlated with the sample tag subset. Finally, the policy function is calculated through the timely incentive function and the marginal probability. For a detailed calculation formula, refer to the illustration of the reinforcement learning algorithm in the following embodiments.

In some embodiments of this application, that the terminal performs discrimination on the sample tag subset and the visual feature of the image through the adversarial network model includes:

vectorizing, by the terminal, all sample tags in the sample tag subset, to obtain a plurality of sample tag vectors;

obtaining, by the terminal, correlation scores between the plurality of sample tag vectors and a feature vector corresponding to the sample visual feature; and obtaining, by the terminal, a correlation score between the sample tag subset and the visual feature of the image according to the correlation scores corresponding to the plurality of sample tag vectors.

The terminal first vectorizes all sample tags in the sample tag subset. For example, by using a GloVe algorithm, a vectorized representation of each tag is obtained. That is, each word is represented by a numeric vector. After the tag subset generated by the generative network model is given, the vector representation of each tag may be generated. A feature vector corresponding to the sample visual feature is obtained. A correlation score between each sample tag vector and the feature vector is respectively calculated. For example, by using the sigmoid function, a score in a range of [0, 1] is obtained. 1 represents that the sample tag is perfectly correlated to the sample image, and 0 represents that the sample tag is in zero correlation to the sample image. Correlation scores between all the sample tags and the sample image are calculated, and an average value of the correlation scores corresponding to all the sample tags in one tag subset is calculated as the correlation score between the sample tag subset and the sample image.

104. The terminal outputs M distinct tag subsets through the generative adversarial network model after the M pieces of random noise are inputted into the generative adversarial network model, the M tag subsets being diverse from each other.

In this embodiment of this application, each time random noise is inputted into the generative adversarial network model, step 103 may be performed once. When the M pieces of random noise are sequentially inputted into the generative adversarial network model, step 103 needs to be performed M times. As a result, M distinct tag subsets may be outputted through the generative adversarial network model after the M pieces of random noise are inputted into the generative adversarial network model, the M tag subsets being diverse from each other. In this embodiment of this application, M pieces of random noise are inputted into the generative adversarial network model. One distinct tag subset may be respectively outputted each time one piece of the different random noise is mixed with the visual feature of the image. Therefore, the generative adversarial network model provided by this embodiment of this application may finally output M distinct and diverse tag subsets. Through random disturbances generated by the M pieces of random noise, different focuses and cognitive ranges of different people may be simulated. The randomness also conforms to an inexorable rule of manual annotation, that is, different people provide different tag subsets. Therefore, the M tag subsets outputted in this embodiment of this application have tag subset diversity.

Through the foregoing embodiments, it may be learned from the descriptions of the embodiments of this application that, the terminal first extracts a visual feature of a to-be-annotated image from the to-be-annotated image through a generative adversarial network; sequentially inputs M pieces of random noise into the generative adversarial network model; performs, in a case that a single piece of random noise is inputted into the generative adversarial network model, determinantal point process (DPP) processing on the visual feature and the single piece of random noise through the generative adversarial network model, to obtain N randomly selected tag subsets; and selects one distinct tag subset from the N randomly selected tag subsets through the generative adversarial network model. M distinct tag subsets are outputted through the generative adversarial network model after the M pieces of random noise are inputted into the generative adversarial network model, the M tag subsets being diverse from each other. In the embodiments of this application, DPP processing may be performed on a visual feature of an image and a single piece of random noise, to output N randomly selected tag subsets, and one distinct tag subset may be selected from the N tag subsets. In a case that M pieces of random noise are inputted into a generative adversarial network model, distinct tag subsets respectively corresponding to each piece of random noise may be outputted. Therefore, a plurality of diverse and distinct tag subsets are finally generated, thus achieving a human-like image annotation effect and implementing a comprehensive description of the image.

For better understanding and implementation of the foregoing solutions in the embodiments of this application, the following makes a specific description by using a corresponding application scenario as an example.

In the image annotation method provided in this embodiment of this application, inspired by a result of manual image annotation, a new automatic image annotation task is defined, so that a result of automatic annotation is more similar to a result of manual annotation. In this embodiment of this application, a diverse and distinct image annotation-generative adversarial networks (D2IA-GAN) model is provided, and a plurality of diverse and distinct tag subsets may be automatically generated by using technologies such as the convolutional neural network (CNN), the generative adversarial network (GAN), reinforcement learning (RL) and determinantal point process sampling (DPP sampling).

In this embodiment of this application, the terminal generates a plurality of different tag subsets through the D2IA-GAN model. Redundancy between tags in each tag subset is required to be little, and moreover, different tag subsets are required to cover semantic information as different as possible. Apparently, the tag subsets generated in this embodiment of this application better conform to characteristics of manual annotation. The D2IA-GAN model provided in this embodiment of this application is completely different from a DIA model provided in the related art, and a used training method is also different. Compared with a DIA method provided in the related art, the image annotation method provided in this embodiment of this application may generate a result more similar to manual annotation. Specifically, in terms of the models, the D2IA-GAN model provided in this embodiment of this application is based on a GAN model framework and includes a generator and a discriminator, while the DIA model is only used as a part of the generator in the D2IA-GAN. In terms of objectives, the D2IA-GAN is used for generating a plurality of diverse and distinct tag subsets, while the DIA may only generate one distinct tag subset. In terms of training methods, in the D2IA-GAN model, iterative training is performed on the generator and the discriminator. During training of the generator, in this embodiment of this application, the reinforcement learning technology is used to estimate a derivative of a discrete sampling procedure. During training of the discriminator, in this embodiment of this application, a semantic F1 index (that is, an evaluation standard of a D2IA task) is embedded to guide the tag subsets generated by the entire model to be closer to a result of manual annotation. By contrast, only a standard stochastic gradient descent algorithm is used in training of the DIA, and the discrete sampling procedure and the semantic F1 index cannot be embedded into the training procedure.

Figure 2:
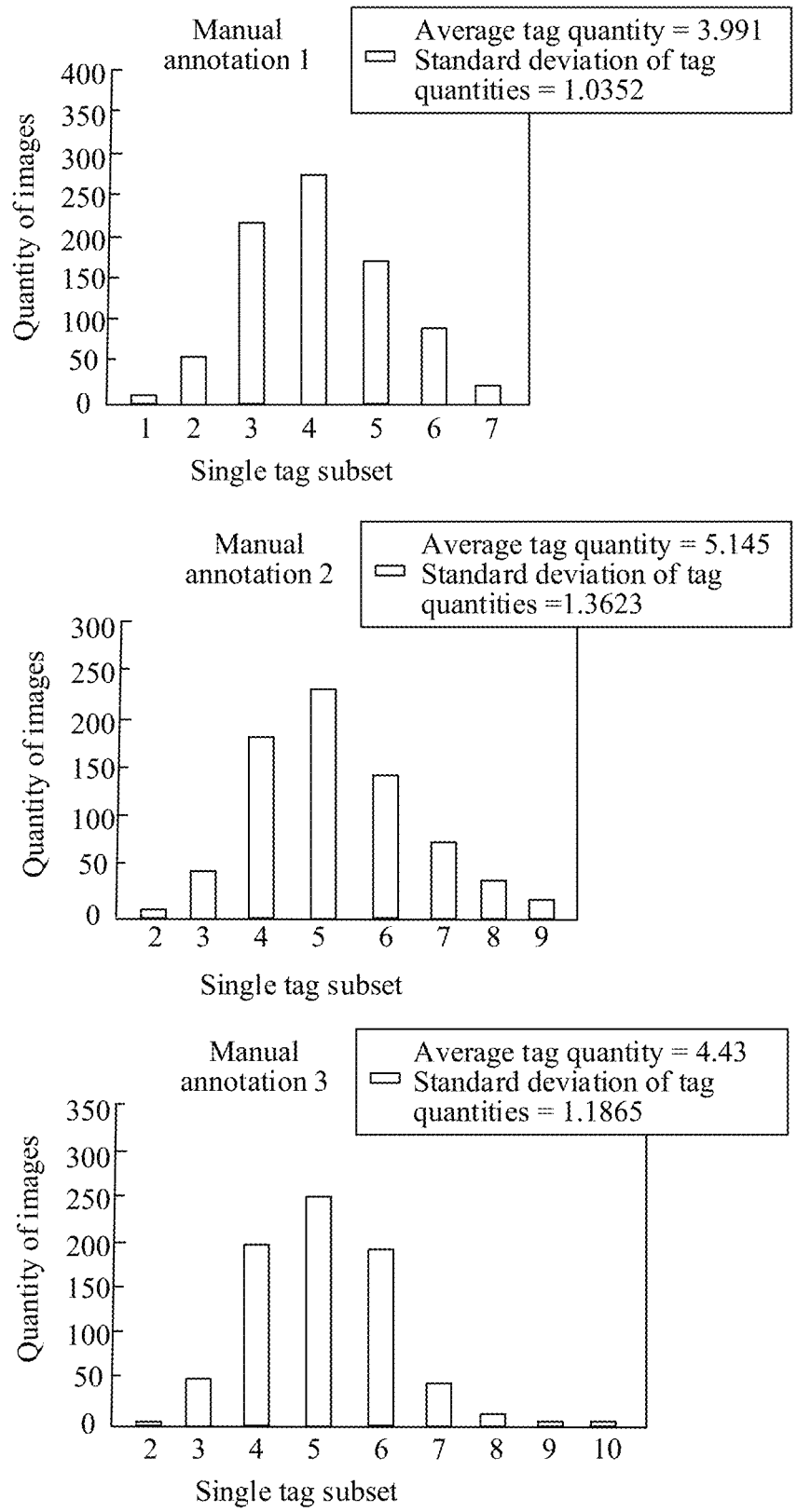
FIG. 2 is a schematic diagram of statistics of the quantity of tags included in a single tag subset according to an embodiment of this application.

FIG. 2 is a schematic diagram of statistics of the quantity of tags included in a single tag subset according to an embodiment of this application. Diversity and distinctness in manual image annotation are first described. In this embodiment of this application, characteristics of manual annotation are analyzed. Specifically, first 1000 test images in a dataset IAPRTC-12 are selected, and three annotators are organized. The three annotators are required to separately annotate each image (that is, providing a plurality of tags for each image). The only requirement is to "describe as much content as possible in the image by using as few tags as possible".

For each image, three tag subsets of manual annotation are obtained. A terminal collects statistics about an annotation result of each person, and obtains a statistical diagram shown in FIG. 2. It can be seen from the statistical diagram shown in FIG. 2 that, mean represents an average tag quantity, and std represents a standard deviation of the tag quantities. In most cases, people may describe main content of an image by using relatively few tags (3 to 5). By observing each individual tag subset, it can be seen that tags in the same tag subset usually describe different objects or content, and a semantically redundant tag rarely occurs. For example, the annotator generally does not describe an object "horse" in an image by using a tag "horse" and a tag "animal" at the same time. It indicates that, when performing annotation, people follow a given rule, that is, avoiding semantic redundancy between tags. Such a rule is defined as tag distinctness. That is, tags are semantically distinct, and there is no semantic redundancy.

Figure 3:
FIG. 3 is a schematic diagram of tag subsets used by different people for annotating the same image according to an embodiment of this application.
Figure 3:
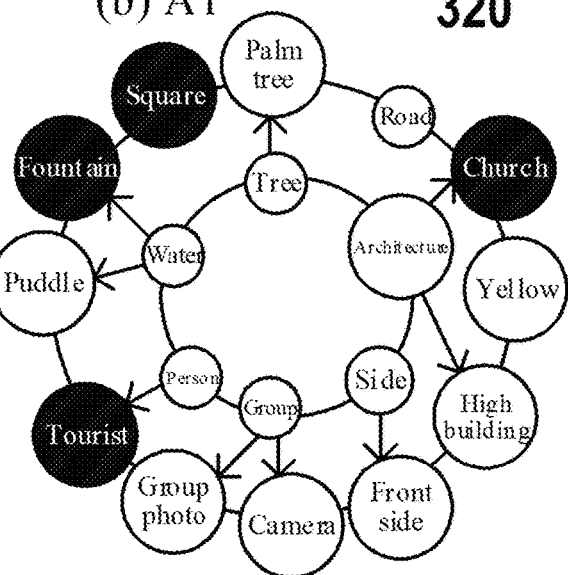
Figure 3:
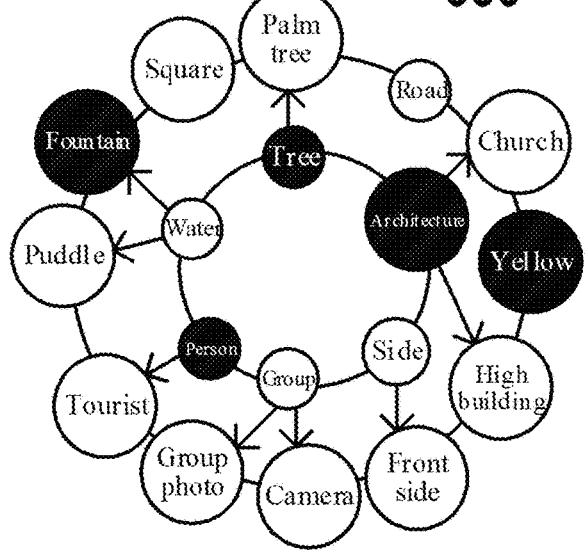
Figure 3:
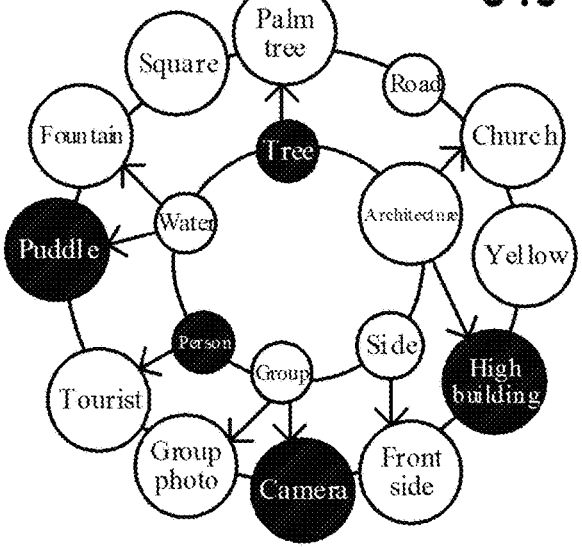

Meanwhile, the three tag subsets of manual annotation for the same image are compared and analyzed. It rarely occurs that the three subsets or even two subsets are completely the same. Different subsets usually focus on different objects. Even when describing the same object, different people may use different tags, which may be synonyms or different semantic hierarchies describing the same object. This phenomenon may be observed from an example in FIG. 3. This phenomenon occurs because different people have different focuses and cognitive ranges, and also because people have different concentration degrees of during annotation. This seemingly randomness also leads to an inexorable rule of manual annotation, that is, different people provide different tag subsets. Such a rule is defined as the diversity of tag subsets. FIG. 3 is a schematic diagram of tag subsets used by different people for annotating the same image 310 according to an embodiment of this application. A1 (320), A2 (330), and A3 (340) represent three annotators, and black circular nodes represent annotation tags.

The following describes diverse and distinct automatic image annotation in this embodiment of this application. Inspired by the diversity and diversity rules in manual annotation, in this embodiment of this application, a new automatic image annotation method is designed, to simulate distinctness and diversity, so that a plurality of diverse and distinct tag subsets may be automatically generated for an image, thereby describing the image more comprehensively.

A procedure of generating distinct tag subsets is first described. To better simulate tag distinctness, first, semantic redundancy between tags needs to be accurately defined and measured.

Therefore, a conditional determinantal point process (cDPP) model is introduced, which is a probability model for describing a probability of selecting a subset from a big set under a given condition. A mathematical definition is as follows:

$$\mathcal{P}(T \mid I) = \frac{det(L_T(I))}{det(L_{\mathcal{T}}(I) + I)},$$

I represents an image, T represents a tag subset, $\mathcal{T}$ represents a set of all candidate tags, and I represents a unit matrix. Det (L) represents a determinant of an L matrix. $L_{\mathcal{T}}(I) \in \mathbf{R}^{|\mathcal{T}| \times |\mathcal{T}|}$ is a semi-definite kernel matrix, which includes a probability of a single tag and correlation information between tags, and is defined as follows:

$$L_{ij}(x;W) = q_i(x)\phi_i(x)^T \phi_j(x) q_j(x),$$

$W=[w_1\ w_2\ \ldots\ w_m]$ represents a quality parameter. $q_i(x;w_i)=\exp(0.5 w_i^T x)$ represents a marginal probability of an $i^{th}$ tag, and x represents a visual feature (extracted by using a CNN) of the image I. $\phi_i(x) \in \mathbf{R}^r$ is a normalized direction vector, that is, $\|\phi_i(x)\| \times 1$.

$S(x)=\Phi^T(x)\Phi(x) \in \mathbf{R}^{m \times m}$ represents a correlation matrix between tags, where $S\mathcal{T}(i,j)=\phi_i^T\phi_j$. In this embodiment of this application, a correlation independent of the visual feature x of the image is used. The correlation is defined as follows:

$$S(i,j) = \frac{1}{2} + \frac{\langle t_i, t_j \rangle}{2\|t_i\|_2 \|t_j\|_2} \in [0,1]\ \forall\ i,j \in \mathcal{T},$$

$t_i \in \mathbf{R}^{50}$ represents a vectorized representation of a class i, which is derived from the GloVe algorithm.

Therefore, $\mathcal{P}(T|I)$ may be rewritten as:

$$\mathcal{P}_w(T|I) = \frac{\Pi_{i \in T}[\exp(w_i^T x)] det(S_T)}{\Sigma_{T' \subset \mathcal{T}} \Pi_{i \in T'}[\exp(w_i^T x)] det(S_{T'})},$$

$S_T \in \mathbf{R}^{|T| \times |T|}$ and $S_{T'} \in \mathbf{R}^{|T'| \times |T'|}$ represent sub-matrices of S, which respectively correspond to a subset T and a subset T' of $\mathcal{T}$.

Figure 4:
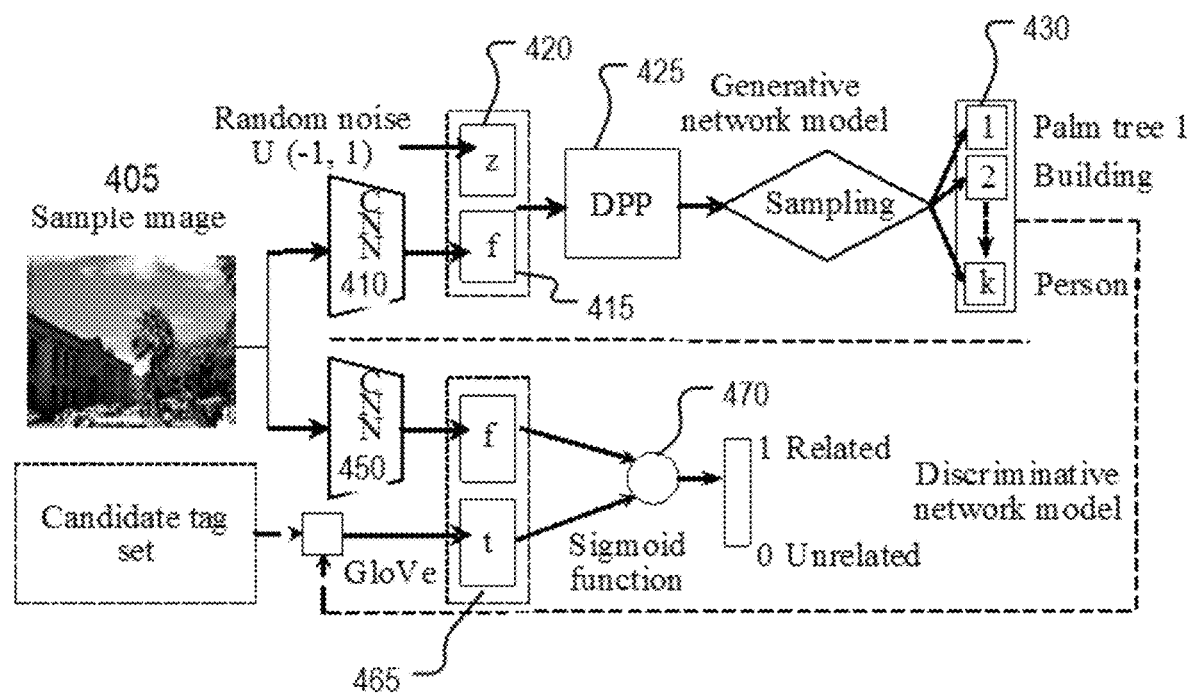
FIG. 4 is a schematic diagram of a calculation method of a correlation function according to an embodiment of this application.
Figure 5:
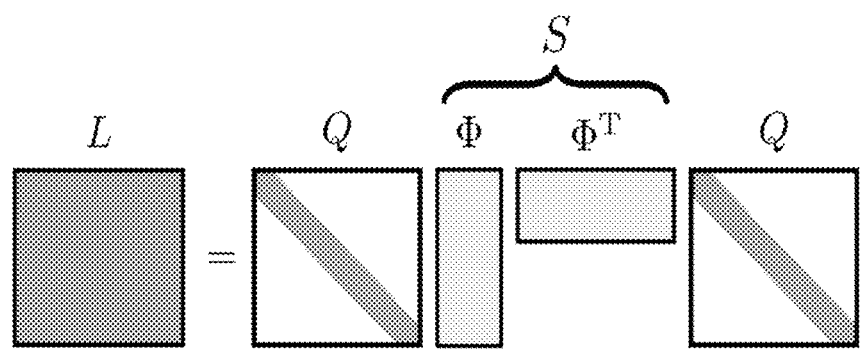
FIG. 5 is a schematic diagram of an area of a region formed by two vectors that correspond to a determinant of a correlation function according to an embodiment of this application.

Apart from the foregoing mathematical definition, there are clear geometrical interpretations for the matrix L and $\mathcal{P}_w(T|I)$. FIG. 4 is a schematic diagram of a calculation method of a correlation function according to an embodiment of this application. L may be decomposed into a marginal probability Q=diag (q1, ..., qm) and a similarity matrix S. FIG. 5 is a schematic diagram of an area of a region formed by two vectors that correspond to a determinant of a correlation function according to an embodiment of this application. It can be seen from FIG. 5 that, if tags in the subset T have relatively high similarity, a probability of T is relatively low. It indicates that, the cDPP model measures negative correlation between tags in a subset, that is, the cDPP model encourages tags in the same subset to be different from each other, that is, to be distinct.

Figure 6:
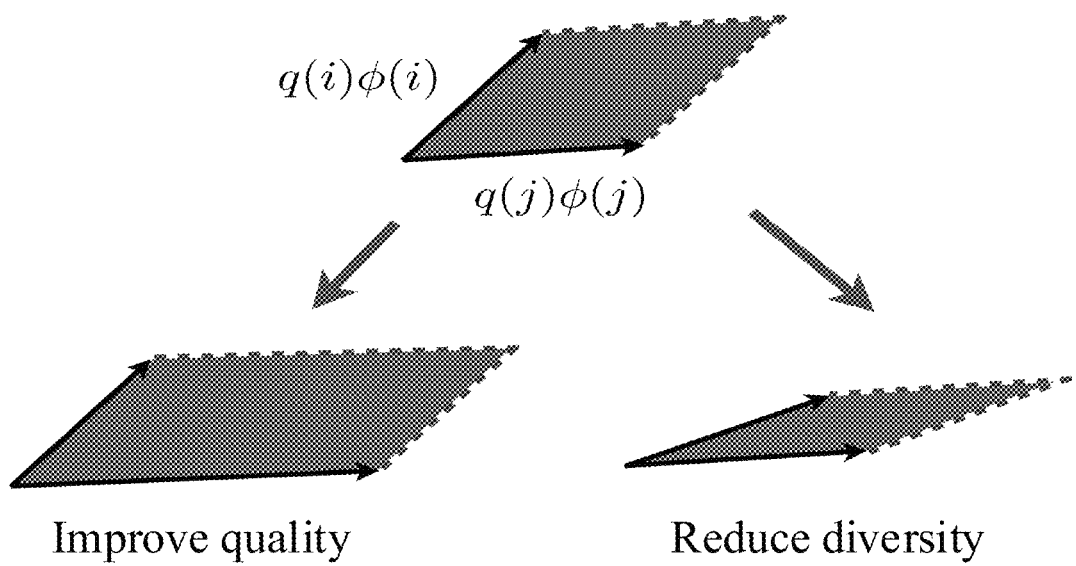
FIG. 6 is a schematic diagram of constructing a weighted semantic path (WSP) according to an embodiment of this application.

FIG. 6 is a schematic diagram of constructing a weighted semantic path (WSP) according to an embodiment of this application. A terminal encodes the diversity and correlation through a DPP model; new semantic measurement may be developed through a WSP. That is, the quantity of paths needs to be ensured, and a layer at which a corresponding word is located needs to be as low as possible, that is, the word is more specific. Using FIG. 6 as an example, both "person" and "people" are objects of the same class. Therefore, during discrimination, simultaneous occurrence of the two words needs to be avoided as far as possible. A deeper layer of the same path (people-woman-lady) indicates that the descriptive word is more specific.

The WSP is defined based on a semantic hierarchical relationship and synonyms between tags, and both the semantic hierarchical relationship and the synonyms may be obtained from WordNet. A basic construction process of the WSP is as follows: (1) tracing upwards, for each node at a bottom layer (that is, a leaf node) in a semantic hierarchical relationship diagram, to find a path to a node at the top layer (that is, a root node), and combining two parent nodes into one node if the two parent nodes are synonymous; (2) calculating, for one path, a weight of each node according to a layer at which each node is located and the quantity of all subnodes of the node in the semantic hierarchical relationship diagram. A basic idea is that, if information expressed by the node is more precise, that is, if the amount of information is larger, the weight is greater.

An example of constructing a WSP is shown in FIG. 6. The WSP may have two functions: (1) ensuring that two tags from the same semantic path are simultaneously selected in a sampling procedure using the cDPP; (2) for a plurality of tag subsets obtained through cDPP sampling, calculating a sum of weights of tags in each subset, and selecting a tag subset with a maximum weight as a final output. The cDPP is a probability model. Sampling performed according to the probability model has randomness. Therefore, a plurality of different tag subsets may be generated.

Figure 7:
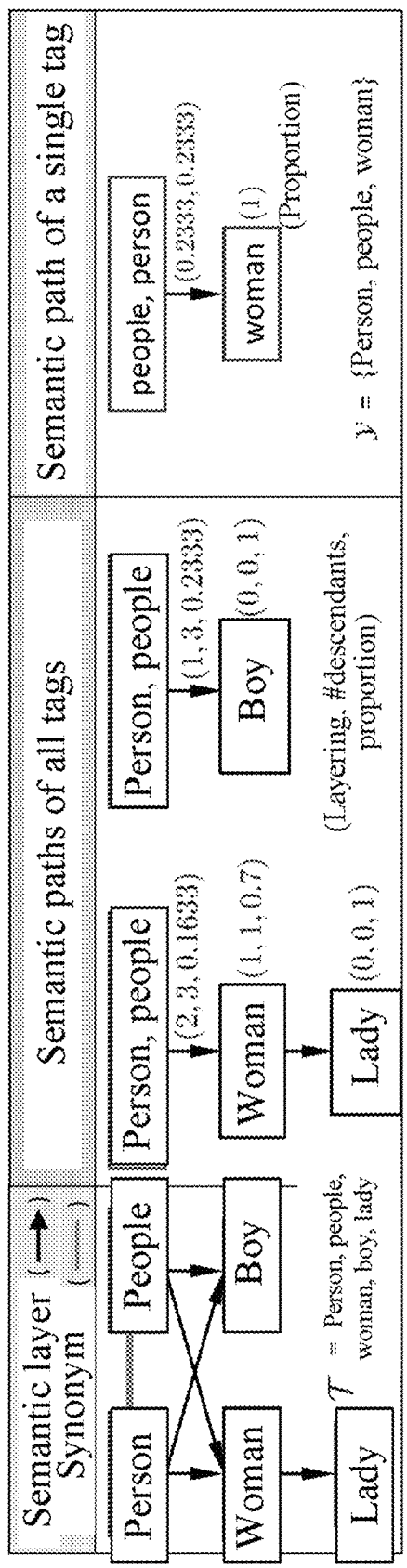
FIG. 7 is a schematic diagram of a procedure of training a generative adversarial network model according to an embodiment of this application.
Figure 8A:
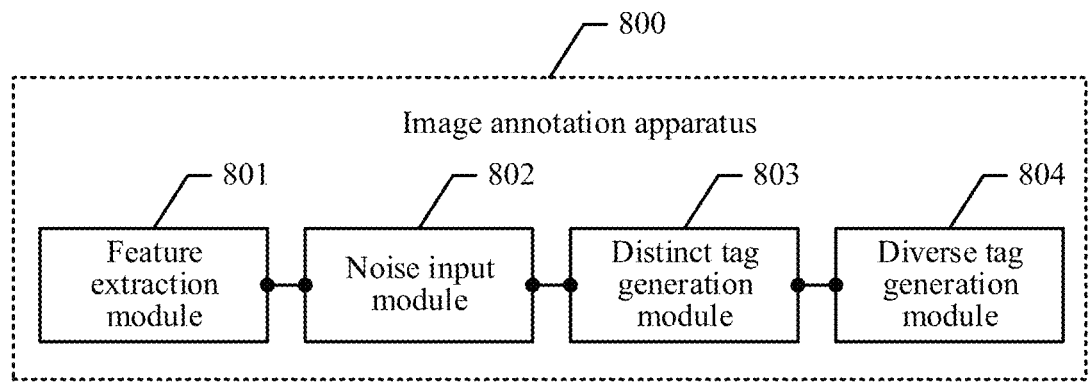
FIG. 8-$a$ is a schematic structural diagram of compositions of an image annotation apparatus according to an embodiment of this application.
Figure 8B:
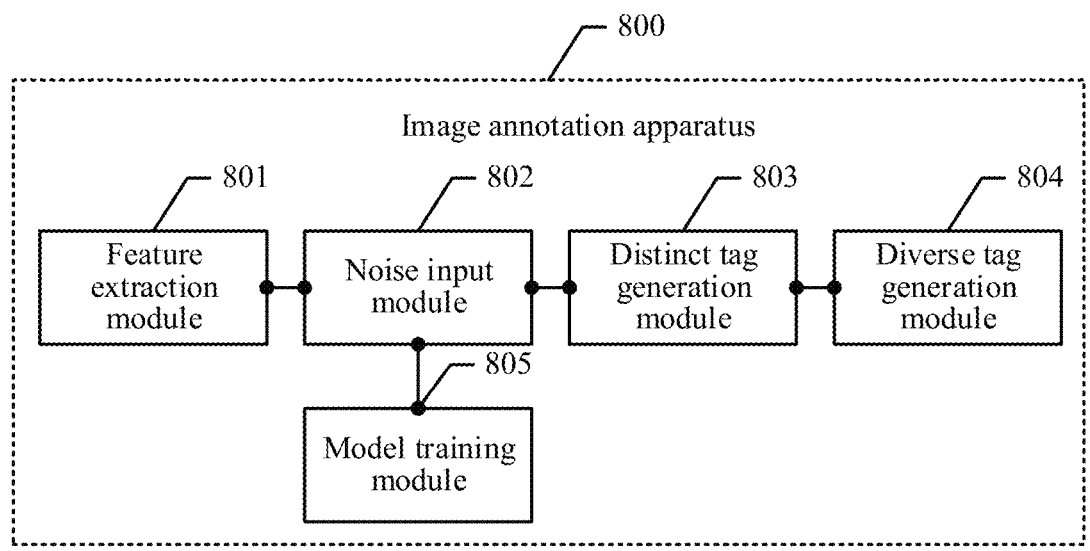
Figure 8C:
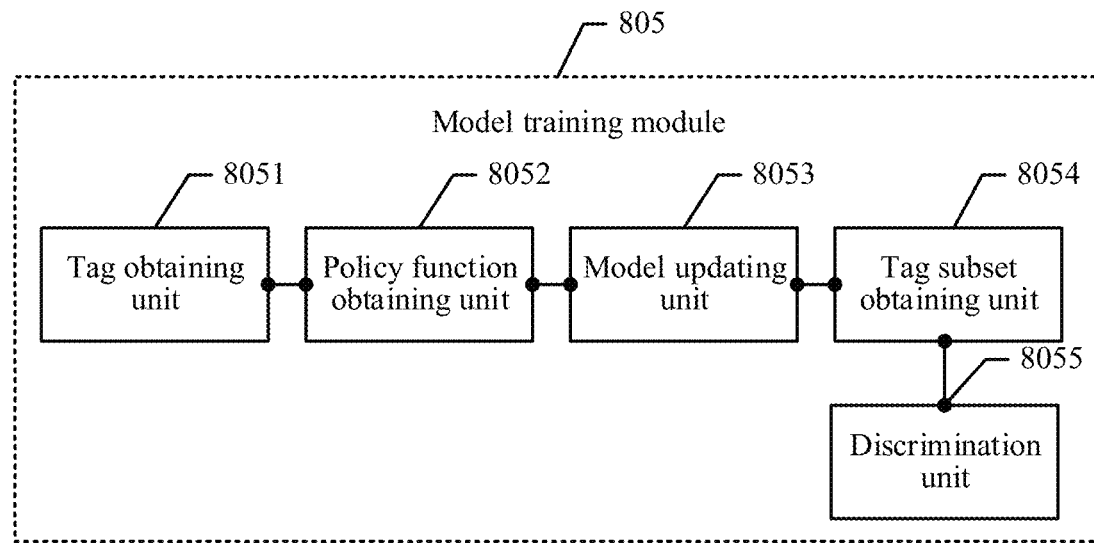
Figure 8D:
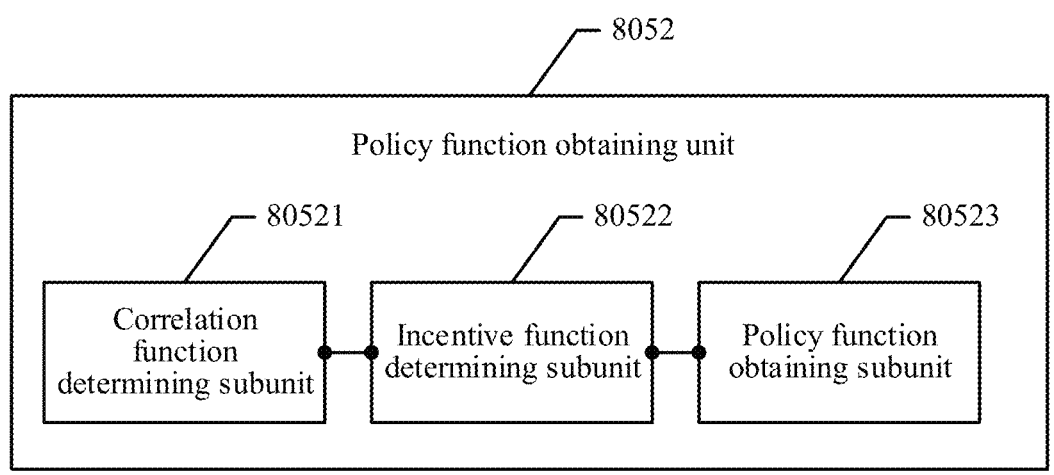
Figure 8E:
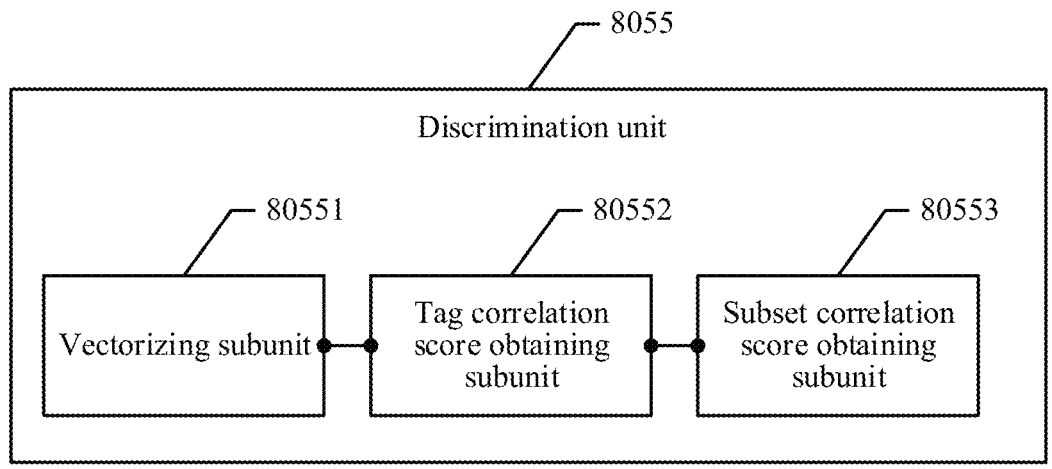
Figure 8F:
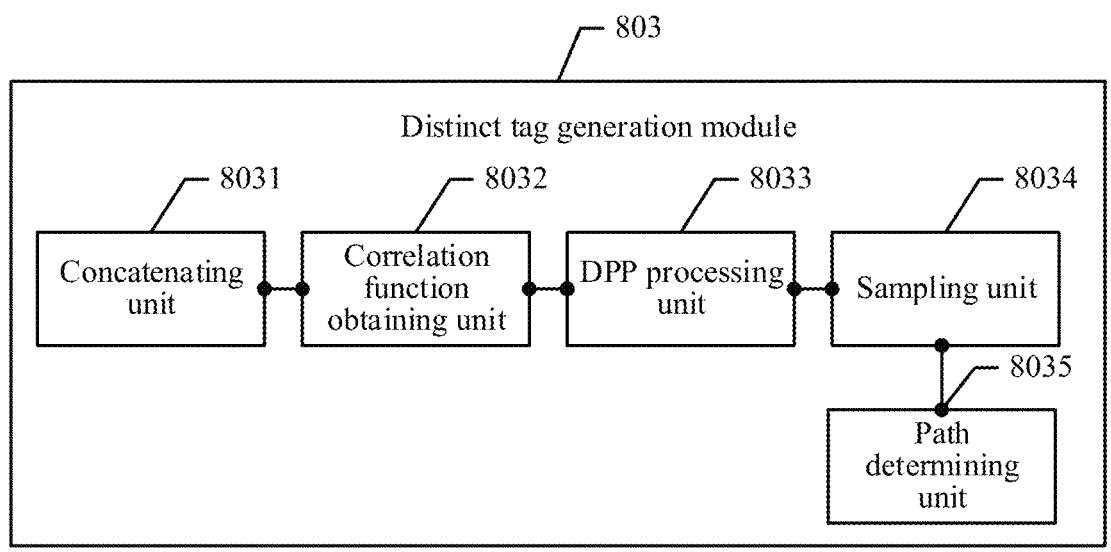

FIG. 7 is a schematic diagram of a procedure of training a generative adversarial network model according to an embodiment of this application. A cDPP sequential sampling procedure based on the weighted semantic path (WSP) is first described. Then, a sequential sampling procedure using the WSP and cDPP is shown, which is used for generating a semantically distinct tag subset. Main steps are as follows:

Step 1. The terminal inputs x, W, S, k, and WSP, where k represents a maximum quantity of tags included in a single tag subset.

Step 2. The terminal calculates a kernel matrix L. to obtain a probability distribution of cDPP.

Step 3. The terminal performs sequential sampling according to the probability distribution of cDPP; and in addition, during each sampling operation, the terminal determines, by using the WSP, whether a tag newly obtained through sampling and a sampled tag (that is, a tag sampled before the current sampling step in the sequential sampling procedure) are from the same semantic path; if so, the terminal discards the tag newly obtained through sampling and performs sampling again; otherwise, the terminal reserves the tag newly obtained through sampling and samples a next tag until k tags are obtained.

Step 4. The terminal repeats the sampling procedure in step 3, to obtain 10 tag subsets, calculates a sum of weights of tags in each subset by using the WSP, and selects a subset with a maximum weight as a final output.

A distinct tag subset may be generated through the foregoing sampling procedure.

Generating a plurality of diverse tag subsets is described hereinafter. The following describes how to simulate a plurality of diverse tag subsets generated manually. One solution is to repeat the sequential sampling procedure, which is described in the foregoing embodiment, for a plurality of times, and select a plurality of different tag subsets. However, differences between tag subsets obtained through sampling using the same cDPP probability distribution are excessively small, which are far smaller than differences between subsets obtained through annotation by different people. In this embodiment of this application, a cDPP probability distribution with a fixed parameter may be considered as annotation logic of a single person. Although different tag subsets may be obtained when the same person is asked to annotate the same image for a plurality of times at different moments, the differences may not be large.

Therefore, to simulate annotation logic of different people, it is necessary to obtain a plurality of different cDPP probability distributions. In this embodiment of this application, such an objective is achieved by using a generative adversarial network (GAN). A main implementation procedure is as follows: a piece of random noise is introduced, and with reference to an input image, a hybrid feature of the random noise and the image is mapped to be a cDPP probability distribution by a generator. A plurality of pieces of random noise are generated, and a plurality of cDPP probability distributions with different parameters are obtained through mapping.

The following describes the D2IA-GAN model shown in FIG. 4 in detail. The D2IA-GAN model includes two parts: a generator and a discriminator.

As shown in FIG. 4, a structure of the generator is as follows:

(1) extracting a feature vector f 415 of an image I 405 by using a convolutional neural network (CNN) 410;

(2) performing uniform sampling in a range of [−1, 1], to obtain a noise vector z 420;

(3) concatenating f and z to form a long vector, and inputting the long vector into a DPP model 425, to obtain a DPP probability distribution; and (4) performing sampling by using the DPP probability distribution and a weighted semantic path (WSP) according to the sampling procedure in the foregoing embodiment, to obtain a distinct tag subset 430.

A mathematical expression of the generator is as follows:

$$\mathcal{G}_\theta(I,z;S\mathcal{T},SP\mathcal{T},k) \sim \mathcal{S}_{k\text{-}DPP,SP} \mathcal{T}(\sqrt{q\mathcal{T}}(I,z), S\mathcal{T}),$$

The left side of ~ represents a generator G, and the right side represents a sampling procedure.

$q\mathcal{T}(I,z)$ represents a marginal tag probability in the cDPP model, and $S\mathcal{T}$ represents a correlation matrix between tags in a tag set $\mathcal{T}$. $\mathcal{S}_{k\text{-}DPP,SP}\mathcal{T}$ represents a sampling procedure described in the foregoing embodiment.

As shown in FIG. 4, a structure of the discriminator including a CNN 450 is as follows:

(1) specifying a tag subset generated by the generator, and generating a vector representation t 465 for each tag by using the GloVe algorithm;

(2) concatenating f and t, and inputting into a sigmoid function 470, to obtain a score in a range of [0, 1], where 1 represents that the tag is perfectly correlated to the image, and 0 represents that the tag is in zero correlation to the image; and (3) calculating correlation scores between all tags and the image, and calculating an average value of the correlation scores corresponding to all the tags in one subset as a correlation score between the subset and the image.

A mathematical expression of the discriminator is as follows:

$$\mathcal{D}_\eta(I,T) = \frac{1}{|T|} \sum_{i \in T} \sigma(w_D^T[f_D(I);t_i] + b_D),$$

σ represents the sigmoid function. $\mathcal{D}_\eta(I,T)$ represents the discriminator, which is used for measuring a correlation score between the image I and the tag subset T. The parameter includes $w\mathcal{D} \in \mathbf{R}^{|f\mathcal{D}^{(I)}|=50}$, $b\mathcal{D} \in \mathbf{R}$, and a parameter of a CNN model for extracting the image feature $f\mathcal{D}(I)$ in the discriminator.

Then, a training procedure of the D2IA-GAN model is illustrated in the following.

According to a general training method of the GAN model, an alternate updating method is used: with given $\mathcal{D}_\eta$, $\mathcal{G}_\theta$ is optimized; and with given $\mathcal{G}_\theta$, and $\mathcal{D}_\eta$ is optimized, until convergence.

With given $\mathcal{D}_\eta$, $\mathcal{G}_\theta$ is optimized as follows:

$$\min_\theta \mathbb{E}_{z \sim U[-1,1]} [\log(1 - \mathcal{D}_\eta(I, \mathcal{G}_\theta(I,z)))],$$

By minimizing the foregoing target function, a correlation (measured by using $\mathcal{D}_\eta$) between a tag subset generated by the generator $\mathcal{G}_\theta(I,z)$ and the image I is maximized. However, according to the definition of $\mathcal{G}_\theta(I,z)$ above, a discrete sampling procedure $\mathcal{S}_{k\text{-}DPP,SP}\mathcal{T}$ is included in the generator. Therefore, the foregoing target function cannot be optimized by using a common continuous optimization method. To resolve this problem, in this embodiment of this application, a policy gradient (PG) algorithm in reinforcement learning is used. The discrete sampling procedure, considered as a sequence generation procedure, is controlled by a continuous policy function. The policy function may measure a possibility that a next tag is selected based on the image I and a sampled tag.

Assuming that T$\mathcal{G}$ is a tag subset obtained through sampling,

T$\mathcal{G}$ = {$y_{[1]}, y_{[2]}, \ldots, y_{[k]}$}, where [i] represents a sequence number of sampling, and T$\mathcal{G}_{-i}$ = {$y_{[1]}, \ldots, y_{[i]}$}, i≤k represents a tag subset obtained through the first i sampling operations. With a given z obtained through sampling in a range of [−1, 1], the foregoing original target function may be simulated as follows:

$$\mathcal{J}_\theta(T_\mathcal{G}) = \sum_{i=1}^{k} \mathcal{R}(I, T_{\mathcal{G}-i}) \log\left(\prod_{t_1 \in T_{\mathcal{G}-i}} q_{t_1}^1 \prod_{t_2 \in \mathcal{T} \setminus T_{\mathcal{G}-i}} q_{t_2}^0\right),$$

$\mathcal{T} \setminus T\mathcal{G}_{-i}$ represents other tags except T$\mathcal{G}_{-i}$ in $\mathcal{T}$. $q_t^1 = \sigma(w_t^T[f\mathcal{G}(I);z]+b\mathcal{G}(t))$ represents a marginal probability of selecting the tag t, and $q_t^0 = 1 - q_t^1$. A timely reward function RV, encourages content of the image I to be highly correlated to the tag subset T$\mathcal{G}$. The timely reward function is defined as follows:

$\mathcal{R}(I,T\mathcal{G}) = -\log(1 - \mathcal{D}_\eta(I,T\mathcal{G}))$.

Compared with a standard continuous policy function, in this embodiment of this application, the timely reward function $\mathcal{R}(I,T\mathcal{G})$ is used to replace a return, and a decomposed probability $\Pi_{t_1 \in T\mathcal{G}_{-i}} q_{t_1}^1 \Pi_{t_2 \in \mathcal{T} \setminus T\mathcal{G}_{-i}} q_{t_2}^0$ is used to replace an original policy probability. Therefore, a gradient value $$\frac{\partial \mathcal{J}_\theta(T_\mathcal{G})}{\partial \theta}$$

may be very easily calculated. By using this gradient value, θ may be updated by using a directional propagation algorithm and a stochastic gradient descent algorithm.

With given $\mathcal{G}_\theta$, $\mathcal{D}_\eta$ is optimized as follows:

$$\max_\eta \frac{1}{|S_{DD-I}|} \sum_{T \in S_{DD-I}} [\beta \log \mathcal{D}_\eta(I,T) - (1-\beta)(\mathcal{D}_\eta(I,T) - F_{1\text{-}sp}(I,T))^2] + \beta \log(1 - \mathcal{D}_\eta(I,T_\mathcal{G})) - (1-\beta)(\mathcal{D}_\eta(I,T_\mathcal{G}) - F_{1\text{-}sp}(I,T_\mathcal{G}))^2$$

$F_{1\text{-}sp}(I,T)$ represents an F1 index based on the WSP, and is used for measuring a correlation between the image I and the tag subset T. The F1 index is also used as one of quantitative measurement criteria. A gradient value of the foregoing target function with respect to η may be very easily calculated, and η may be optimized by using a stochastic gradient ascent algorithm.

Next, an experiment is conducted to test the image annotation method provided by this embodiment of this application.

First, the experiment is configured as follows: An experimental dataset is shown in Table 1 below. An automatic image method in comparison includes ML-MG, LEML, and DIA. Distinctness of tags is not considered at all in ML-MG and LEML, and only a posterior probability of each tag is outputted. For a fair comparison, the outputted posterior probability is used as a marginal probability q in a DPP model, and then cDPP sampling based on a WSP is performed. Therefore, in this embodiment of this application, MLMG-DPP and LEML-DPP are used in substitution. Semantic accuracy $P_{sp}$, a semantic recall rate $R_{sp}$, and a semantic F1 index $F_{1-sp}$ are used as measurement criteria of an experiment result. In a conventional measurement criterion, one tag is considered as one measurement unit. In the semantic criterion, one semantic path is considered as one measurement unit, and weights of different nodes in the semantic path are considered. Compared with the conventional measurement criterion, the semantic criterion may more accurately measure the distinctness and diversity of a predicted tag subset, and is closer to a manual measurement standard.

TABLE 1

Experimental dataset

| Dataset | Training image | Test image | Quantity of tags | Feature dimension | Semantic path | Semantic path of each image |
|---|---|---|---|---|---|---|
| ESP Game | 18689 | 2081 | 268 | 597 | 106 | 4.56 |
| IAPRTC-12 | 17495 | 1957 | 291 | 536 | 139 | 5.85 |

Comparison results of the experiment are objectively quantified in the following. Experimental comparisons on ESP Game are shown in Table 2. "3 tags" represents that, during sampling, each tag subset includes three tags at most; and "5 tags" represents that five tags are sampled at most. "single subset" means that, for each method, ten tag subsets are obtained after sampling is performed ten times, and a subset with a maximum sum of tag weights (weights of tags in the WSP) is selected as an output to be measured. "ensemble subset" means that, five subsets with maximum sums of tag weights are selected from the ten subsets, all tags of the five subsets are combined to form a larger tag subset, and measurement is then performed. The results in Table 2 indicate that:

The method in this embodiment of this application, that is, D2IA-GAN, is better than other methods in most evaluation indexes. Experimental results of IAPRTC-12 are shown in Table 3, and D2IA-GAN also achieves an excellent effect.

TABLE 2

Experimental results of ESP Game

| target | method | 3 tags | | | 5 tags | | |
|---|---|---|---|---|---|---|---|
| | | $P_{sp}$ | $R_{sp}$ | $F_{1-sp}$ | $P_{sp}$ | $R_{sp}$ | $F_{1-sp}$ |
| single subset | LEML-DPP [31] | 34.64 | 25.21 | 27.76 | 29.24 | 35.05 | 30.29 |
| | MLMG-DPP [26] | 37.18 | 27.71 | 30.05 | 33.85 | 38.91 | 34.30 |
| | DIA [23] | 41.44 | 31.00 | 33.61 | 34.99 | 40.92 | 35.78 |
| | D²IA-GAN | 42.96 | 32.34 | 34.93 | 35.04 | 41.50 | 36.06 |

TABLE 2-continued

Experimental results of ESP Game

| target | method | 3 tags | | | 5 tags | | |
|---|---|---|---|---|---|---|---|
| | | $P_{sp}$ | $R_{sp}$ | $F_{1-sp}$ | $P_{sp}$ | $R_{sp}$ | $F_{1-sp}$ |
| ensemble subset | LEML-DPP [31] | 34.62 | 38.09 | 34.32 | 29.04 | 46.61 | 34.02 |
| | MLMG-DPP [26] | 30.44 | 34.88 | 30.70 | 28.99 | 43.46 | 33.05 |
| | DIA [23] | 35.73 | 33.53 | 32.39 | 32.62 | 40.86 | 34.31 |
| | D²IA-GAN | 36.73 | 42.44 | 36.71 | 31.28 | 48.74 | 35.82 |

TABLE 3

Experimental results of IAPRTC-12

| target | method | 3 tags | | | 5 tags | | |
|---|---|---|---|---|---|---|---|
| | | $P_{sp}$ | $R_{sp}$ | $F_{1-sp}$ | $P_{sp}$ | $R_{sp}$ | $F_{1-sp}$ |
| single subset | LEML-DPP [31] | 41.42 | 24.39 | 29.00 | 37.06 | 32.86 | 32.98 |
| | MLMG-DPP [26] | 40.93 | 24.29 | 28.61 | 37.06 | 33.68 | 33.29 |
| | DIA [23] | 42.65 | 25.07 | 29.87 | 37.83 | 34.62 | 34.11 |
| | D²IA-GAN | 43.57 | 26.22 | 31.04 | 37.31 | 35.35 | 34.41 |
| ensemble subset | LEML-DPP [31] | 35.22 | 32.75 | 31.86 | 32.28 | 39.89 | 33.74 |
| | MLMG-DPP [26] | 33.71 | 32.00 | 30.64 | 31.91 | 40.11 | 33.49 |
| | DIA [23] | 35.73 | 33.53 | 32.39 | 32.62 | 40.86 | 34.31 |
| | D²IA-GAN | 35.49 | 39.06 | 34.44 | 32.50 | 44.98 | 35.34 |

Comparison results of the experiment are subjectively quantified in the following. A subjective testing experiment is further performed in this embodiment of this application, to allow people to participate in result evaluation. Specific configurations are as follows: filtering is first performed. For the same test image, in this embodiment of this application, two groups of results: DIA and D2IA-GAN, are provided, and measurement is performed by using $F_{1-sp}$. If F1 scores of both groups of results are greater than 0.2, and a difference between the F1 scores is greater than 0.15, this image is reserved. Which group of tags is a better description of this image is subjectively determined by people. A reason of performing such filtering is that: if the F1 scores of both groups of results are low, it indicates that neither group describes the image well, and people cannot make a judgment; if the F1 scores of the two groups are too close, it indicates that the tags in the two groups may be close, and it is difficult for people to make a judgment, and people may randomly select one group. An image after filtering may ensure accuracy of the judgment made by people. For two groups of results for each image, in this embodiment of this application, five people are asked to independently evaluate which group of results is better. Which group of results is better is finally decided based on a simple majority principle. In ESP Game and IAPRTC-12, subjective evaluation results of people are shown in Table 4 and Table 5. From the results, three conclusions may be obtained in this embodiment of this application: (1) For over 60% of images, people think results of the method D2IA-GAN of this embodiment of this application are better than results of DIA; (2) for over 60% of images, semantic F1 scores of the D2IA-GAN results are higher than the scores of the DIA results; and (3) for over 60% or even 70% of images, the results of manual evaluation and F1 evaluation are consistent, which indicates that measurement using the semantic F1 index is relatively accurate, and may reflect a rule of manual evaluation.

TABLE 4

Manual subjective evaluation experiment over the ESP Game dataset

| # tags → | 3 tags | | | 5 tags | | |
|---|---|---|---|---|---|---|
| metric↓ | DIA wins | D²IA-GAN wins | total | DIA wins | D²IA-GAN wins | total |
| human evaluation | 135 | 240 | 375 | 120 | 204 | 324 |
| $F_{1\text{-}sp}$ | 125 | 250 | 375 | 112 | 212 | 324 |
| consistency | 62 | 177 | 63.73% | 65 | 157 | 68.52% |

TABLE 5

Manual subjective evaluation experiment over the IAPRTC-12 dataset

| # tags → | 3 tags | | | 5 tags | | |
|---|---|---|---|---|---|---|
| metric↓ | DIA wins | D²IA-GAN wins | total | DIA wins | D²IA-GAN wins | total |
| human evaluation | 129 | 213 | 342 | 123 | 183 | 306 |
| $F_{1\text{-}sp}$ | 141 | 201 | 342 | 123 | 183 | 306 |
| consistency | 82 | 154 | 69.01% | 58 | 118 | 57.52% |

To make the description simple, the foregoing method embodiments are stated as a series of action combinations. However, a person skilled in the art needs to understand that this application is not limited to the described sequence of the actions because according to this application, some operations may use another sequence or may be simultaneously performed. In addition, it is to be understood by a person skilled in the art that the embodiments described in the specification all belong to exemplary embodiments and the actions and modules are not mandatory to this application.

For the convenience of a better implementation of the foregoing solutions of the embodiments of this application, the following further provides related apparatuses configured to implement the foregoing solutions.

Referring to FIG. 8-a, an embodiment of this application provides an image annotation apparatus 800. The apparatus may be installed in a terminal. The apparatus may include: a feature extraction module 801, a noise input module 802, a distinct tag generation module 803, and a diverse tag generation module 804, where the feature extraction module 801 is configured to extract a visual feature of a to-be-annotated image from the to-be-annotated image through a generative adversarial network;

the noise input module 802 is configured to sequentially input M pieces of random noise into the generative adversarial network model, M being a positive integer;

the distinct tag generation module 803 is configured to perform, in a case that a single piece of random noise is inputted into the generative adversarial network model, determinantal point process (DPP) processing on the visual feature and the single piece of random noise through the generative adversarial network model, to obtain N randomly selected tag subsets, and select one distinct tag subset from the N randomly selected tag subsets through the generative adversarial network model, N being a positive integer; and the diverse tag generation module 804 is configured to output M distinct tag subsets through the generative adversarial network model after the M pieces of random noise are inputted into the generative adversarial network model, the M tag subsets being diverse from each other.

In some embodiments of this application, the generative adversarial network model includes: a generative network model and an adversarial network model. As shown in FIG. 8-b, the image annotation apparatus 800 further includes: a model training module 805, where the feature extraction module 801 is further configured to: before extracting the visual feature of the to-be-annotated image from the to-be-annotated image through the generative adversarial network, obtain a sample image from a sample database; and extract a sample visual feature from the sample image through the generative network model;

the distinct tag generation module 802 is further configured to perform DPP processing on the sample visual feature and a single piece of random noise through the generative network model, to obtain N randomly selected sample tag subsets; and select one distinct sample tag subset from the N sample tag subsets through the generative network model; and the model training module 805 is configured to perform alternate training on the generative network model and the adversarial network model by using the sample tag subset and the sample visual feature of the sample image.

In some embodiments of this application, as shown in FIG. 8-c, the model training module 805 includes:

a tag obtaining unit 8051, configured to obtain, in current training of the generative network model, a sampled tag outputted by the generative network model in previous training;

a policy function obtaining unit 8052, configured to obtain, through a reinforcement learning algorithm, a policy function used for measuring a possibility that the generative network model outputs a next tag based on the sample image and the sampled tag;

a model updating unit 8053, configured to update the generative network model according to a gradient value of the policy function;

a tag subset obtaining unit 8054, configured to obtain, in current training of the adversarial network model, a distinct sample tag subset outputted by the generative network model on which the current training is completed; and a discrimination unit 8055, configured to perform discrimination on the sample tag subset and the sample visual feature through the adversarial network model, and output a discrimination result.

In some embodiments of this application, as shown in FIG. 8-d, the policy function obtaining unit 8052 includes:

a correlation function determining subunit 80521, configured to determine a correlation function between the sampled tag and the sample image through the generative network model;

an incentive function determining subunit 80522, configured to obtain a timely incentive function according to the correlation function between the sampled tag and the sample image; and a policy function obtaining subunit 80523, configured to obtain the policy function according to the timely incentive function and a marginal probability of selecting the next tag. In one implementation, the timely incentive function may include a timely reward function.

In some embodiments of this application, as shown in FIG. 8-e, the discrimination unit 8055 includes:

a vectorizing subunit 80551, configured to vectorize all sample tags in the sample tag subset, to obtain a plurality of sample tag vectors;

a tag correlation score obtaining subunit 80552, configured to obtain correlation scores between the plurality of sample tag vectors and a feature vector corresponding to the sample visual feature; and a subset correlation score obtaining subunit 80553, configured to obtain a correlation score between the sample tag subset and the visual feature of the image according to the correlation scores corresponding to the plurality of sample tag vectors.

In some embodiments of this application, as shown in FIG. 8-f, the distinct tag generation module 803 includes:

a concatenating unit 8031, configured to concatenate a feature vector corresponding to the visual feature and a noise vector corresponding to the single piece of random noise, to obtain a concatenated hybrid vector;

a correlation function obtaining unit 8032, configured to obtain, according to a candidate tag set, a correlation function unrelated to the visual feature;

a DPP processing unit 8033, configured to perform DPP processing on the correlation function and the hybrid vector through the generative adversarial network model, to obtain a probability distribution function;

a sampling unit 8034, configured to perform sequential sampling according to the probability distribution function, to obtain a current tag and a sampled tag that is obtained before current sampling;

a path determining unit 8035, configured to determine, by using a weighted semantic path (WSP), whether the current tag and the sampled tag are from the same semantic path; and the sampling unit 8034 is further configured to discard the current tag and perform sampling again in a case that the current tag and the sampled tag are from the same semantic path; reserve the current tag and sample a next tag in a case that the current tag and the sampled tag are not from the same semantic path, until a quantity of tags obtained through sampling reaches a maximum tag quantity of a tag subset; and continue to perform sampling in a case that the quantity of tags obtained through sampling reaches the maximum tag quantity of the tag subset, until the N tag subsets are collected.

In some embodiments of this application, the diverse tag generation module 804 is specifically configured to respectively calculate a sum of weights corresponding to all tags in each tag subset in the N tag subsets by using the WSP, to obtain total tag weights respectively corresponding to the N tag subsets; and select a tag subset with a maximum weight as the distinct tag subset according to the total tag weights respectively corresponding to the N tag subsets.

It may be learned from the foregoing descriptions of this embodiment of this application that, a visual feature of a to-be-annotated image is first extracted from the to-be-annotated image through a generative adversarial network; M pieces of random noise are sequentially inputted into the generative adversarial network model; in a case that a single piece of random noise is inputted into the generative adversarial network model, determinantal point process (DPP) processing is performed on the visual feature and the single piece of random noise through the generative adversarial network model, to obtain N randomly selected tag subsets, and one distinct tag subset is selected from the N randomly selected tag subsets through the generative adversarial network model. M distinct tag subsets are outputted through the generative adversarial network model after the M pieces of random noise are inputted into the generative adversarial network model, the M tag subsets being diverse from each other. In the embodiments of this application, DPP processing may be performed on a visual feature of an image and a single piece of random noise, to output N randomly selected tag subsets, and one distinct tag subset may be selected from the N tag subsets. In a case that M pieces of random noise are inputted into a generative adversarial network model, distinct tag subsets respectively corresponding to each piece of random noise may be outputted. Therefore, a plurality of diverse and distinct tag subsets are finally generated, thus achieving a human-like image annotation effect and implementing a comprehensive description of the image.

Figure 9:
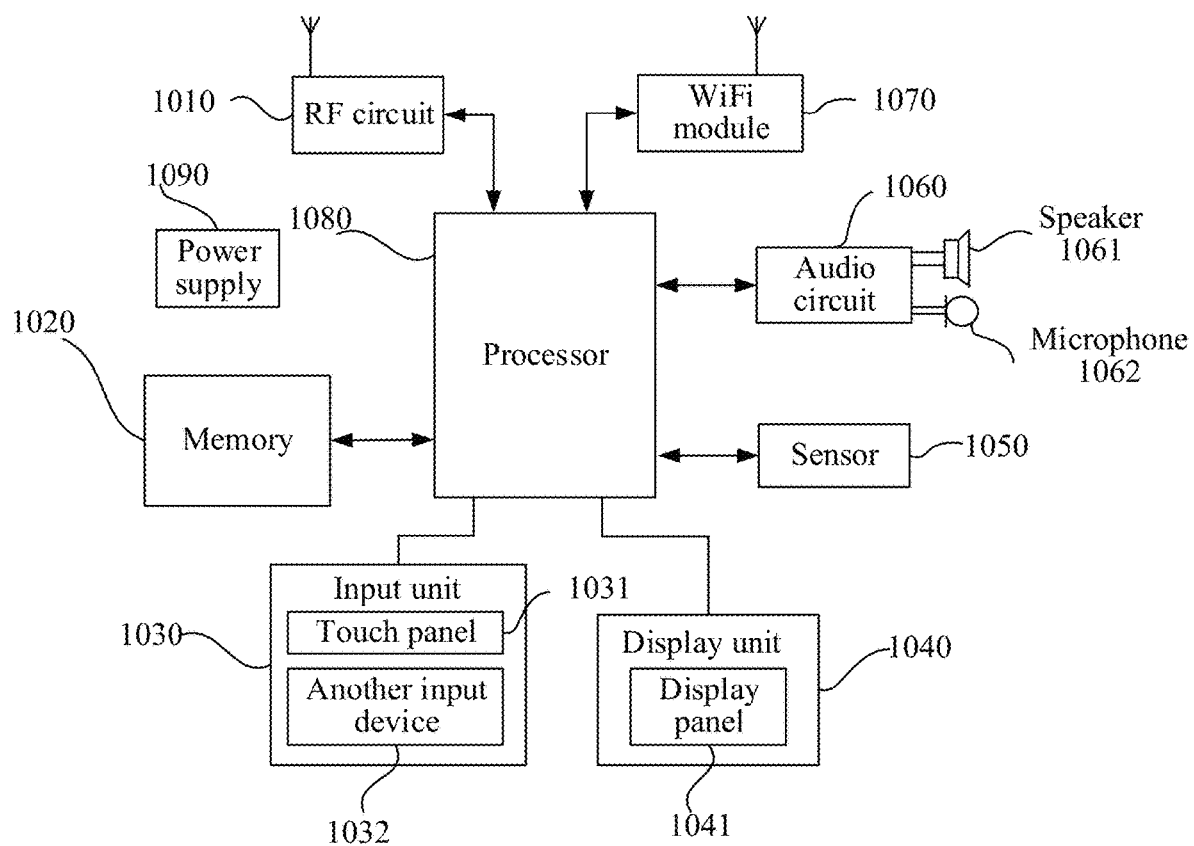
FIG. 9 is a schematic structural diagram of compositions of a terminal to which an image annotation method is applied according to an embodiment of this application.

An embodiment of this application further provides another terminal. As shown in FIG. 9, for ease of description, only parts related to the embodiments of this application are shown. For specific technical details that are not disclosed, refer to the method part in the embodiments of this application. The terminal may be any terminal device, including a mobile phone, a tablet computer, a personal digital assistant (PDA), a point of sales (POS), and an in-vehicle computer. For example, the terminal is a mobile phone.

FIG. 9 is a block diagram of a partial structure of a mobile phone related to a terminal according to an embodiment of this application. Referring to FIG. 9, the mobile phone includes components such as a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply 1090. A person skilled in the art may understand that the structure of the mobile phone shown in FIG. 9 does not constitute a limitation on the mobile phone, and the mobile phone may include more components or fewer components than those shown in the figure, or some components may be combined, or a different component deployment may be used.

The following makes a specific description of components of the mobile phone with reference to FIG. 9.

The RF circuit 1010 may be configured to receive and send signals during an information receiving and sending process or a call process. Specifically, the RF circuit 1010 receives downlink information from a base station, then delivers the downlink information to the processor 1080 for processing, and sends designed uplink data to the base station. Usually, the RF circuit 1010 includes, but is not limited to, an antenna, at least one amplifier, a transceiver, a coupler, a low noise amplifier (LNA), and a duplexer. In addition, the RF circuit 1010 may also communicate with a network and another device through wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1020 may be configured to store a software program and a module. The processor 1080 runs the software program and module stored in the memory 1020, to implement various functional applications and data processing of the mobile phone. The memory 1020 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1020 may include a high speed random access memory, and may also include a non-volatile memory, such as at least one magnetic disk storage device, a flash memory, or another volatile solid-state storage device.

The input unit 1030 may be configured to receive input digit or character information, and generate a keyboard signal input related to the user setting and function control of the mobile phone. The input unit 1030 may include a touch panel 1031 and another input device 1032. The touch panel 1031 is also referred to as a touchscreen, may collect a touch operation that is performed by a user on or near the touch panel 1031 (for example, an operation that is performed by a user by using any appropriate object or accessory such as a finger or a stylus on or near the touch panel 1031), and drive a corresponding connection apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1080. Moreover, the touch controller can receive and execute a command sent from the processor 1080. In addition, the touch panel 1031 may be a touch panel of a resistive, capacitive, infrared, or surface acoustic wave type. In addition to the touch panel 1031, the input unit 1030 may further include the another input device 1032. The another input device 1032 may include, but is not limited to, one or more of a physical keyboard, a functional key (such as a volume control key or a switch key), a track ball, a mouse, and a joystick.

The display unit 1040 may be configured to display information inputted by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. The touch panel 1031 may cover the display panel 1041. After detecting a touch operation on or near the touch panel 1031, the touch panel 1031 transfers the touch operation to the processor 1080, to determine a type of a touch event. Then, the processor 1080 provides a corresponding visual output on the display panel 1041 according to the type of the touch event. Although in FIG. 9, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. The optical sensor may include an ambient light sensor and a proximity sensor, where the ambient light sensor may adjust luminance of the display panel 1041 according to the luminance of the ambient light, and the proximity sensor may switch off the display panel 1041 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1060, a speaker 1061, and a microphone 1062 may provide audio interfaces between the user and the mobile phone. The audio circuit 1060 may convert received audio data into an electrical signal and transmit the electrical signal to the speaker 1061. The speaker 1061 converts the electrical signal into a sound signal for output. On the other hand, the microphone 1062 converts a collected sound signal into an electrical signal. The audio circuit 1060 receives the electrical signal, converts the electrical signal into audio data, and outputs the audio data to the processor 1080 for processing. Then, the processor 1080 sends the audio data to, for example, another mobile phone by using the RF circuit 1010, or outputs the audio data to the memory 1020 for further processing.

Wi-Fi belongs to a short distance wireless transmission technology. The mobile phone may help, by using the Wi-Fi module 1070, a user to receive and send an email, browse a web page, access stream media, and the like. This provides wireless broadband Internet access for the user. Although FIG. 9 shows the Wi-Fi module 1070, it may be understood that the Wi-Fi module 1070 is not a necessary component of the mobile phone, and the Wi-Fi module 1070 may be omitted as required provided that the scope of the essence of this application is not changed.

The processor 1080 is a control center of the mobile phone, and is connected to various parts of the entire mobile phone by using various interfaces and lines. By running or executing a software program and/or module stored in the memory 1020, and invoking data stored in the memory 1020, the processor 1080 executes various functions of the mobile phone and performs data processing, thereby monitoring the entire mobile phone. Optionally, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the foregoing modem may alternatively not be integrated into the processor 1080.

The mobile phone further includes the power supply 1090 (such as a battery) for supplying power to the components. Preferably, the power supply may be logically connected to the processor 1080 by using a power management system, thereby implementing functions such as charging, discharging, and power consumption management by using the power management system.

Although not shown in the figure, the mobile phone may further include a camera, a Bluetooth module, and the like, which are not further described herein.

Figure 10:
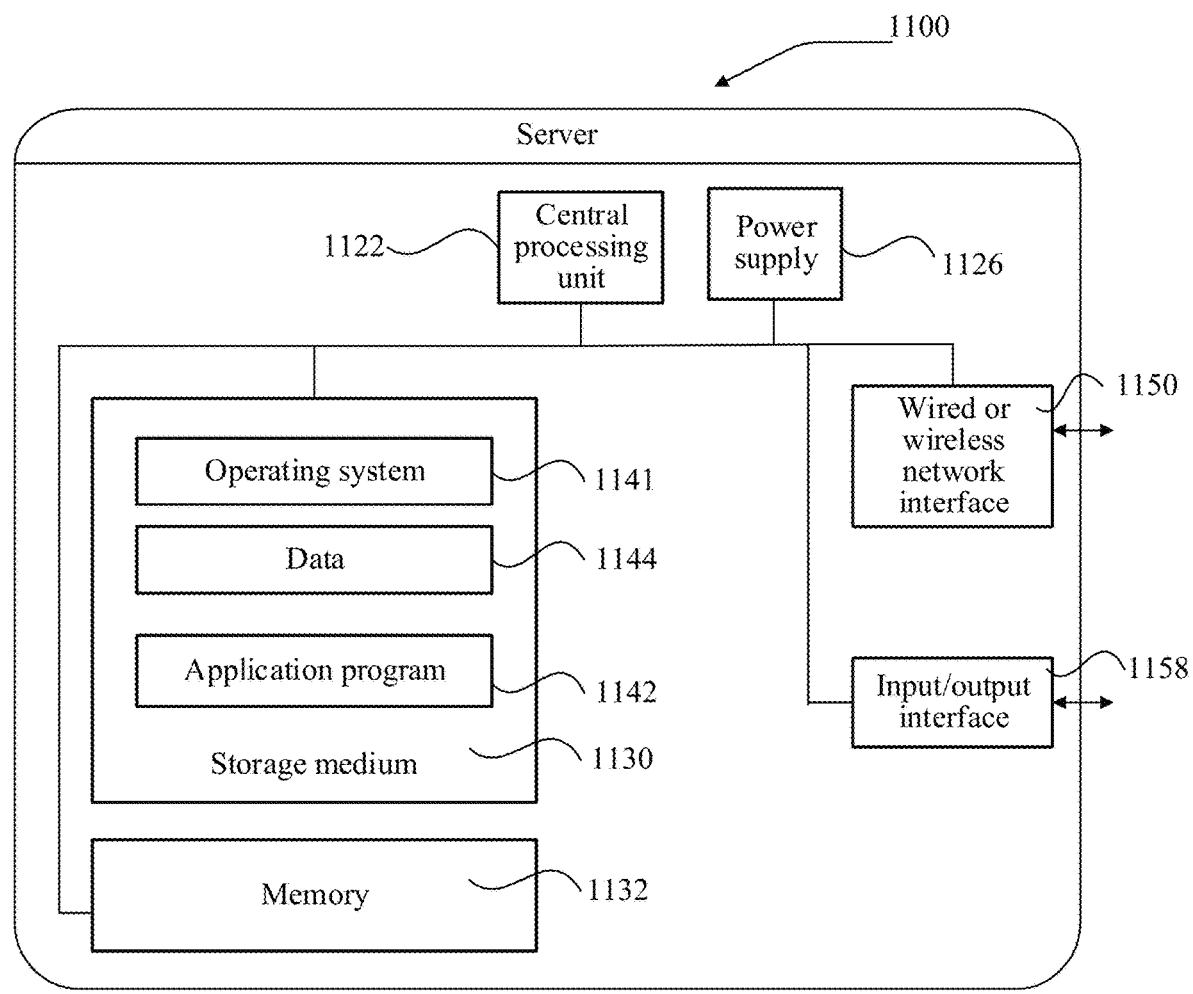
FIG. 10 is a schematic structural diagram of compositions of a server to which an image annotation method is applied according to an embodiment of this application.

In an embodiment of this application, the processor 1080 included in the terminal further controls and performs a procedure of an image annotation method performed by the terminal FIG. 10 is a schematic structural diagram of a server according to an embodiment of this application. The server 1100 may vary greatly due to different configurations or performance, and may include one or more central processing units (CPU) 1122 (for example, one or more processors) and a memory 1132, and one or more storage media 1130 (for example, one or more mass storage devices) that store application programs 1142 or data 1144. The memory 1132 and the storage medium 1130 may be transient storage or permanent storage. The program stored in the storage medium 1130 may include one or more modules (not shown), and each module may include a series of instructions and operations for the server. The central processing unit 1122 may be configured to communicate with the storage medium 1130 to perform the series of instruction operations in the storage medium 1130 on the server 1100.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

The steps of the image annotation method performed by the server in the foregoing embodiment may be based on the server structure shown in FIG. 10.

In addition, the apparatus embodiment described above is merely schematic. Units described as separate parts may or may not be physically separate, and parts displayed as units may or may not be physical units, may be located in one position, or may be distributed on a plurality of network units. Some or all of the modules may be selected based on an actual requirement, to implement an objective of the solution in this embodiment. In addition, in the accompanying drawings of the apparatus embodiments provided by this application, connection relationships between modules indicate that the modules have communication connections with each other, which may be specifically implemented as one or more communications buses or signal cables. A person of ordinary skill in the art may understand and implement this application without creative efforts.

According to another aspect of this embodiment, a storage medium is further provided. The storage medium stores a computer program, the computer program being configured to perform, when being run, steps in any one of the foregoing method embodiments.

Optionally, in this embodiment, the storage medium may be configured to store a computer program used for performing the following steps:

S1. A terminal extracts a visual feature of a to-be-annotated image from the to-be-annotated image through a generative adversarial network.

S2. The terminal sequentially inputs M pieces of random noise into the generative adversarial network model, M being a positive integer.

S3. The terminal performs, in a case that a single piece of random noise is inputted into the generative adversarial network model, determinantal point process (DPP) processing on the visual feature and the single piece of random noise through the generative adversarial network model, to obtain N randomly selected tag subsets, and selects one distinct tag subset from the N randomly selected tag subsets through the generative adversarial network model, N being a positive integer; and S4. The terminal outputs M distinct tag subsets through the generative adversarial network model after the M pieces of random noise are inputted into the generative adversarial network model, the M tag subsets being diverse from each other.

Optionally, in this embodiment, a person of ordinary skill in the art may understand that all or some of the steps of the methods in the foregoing embodiments may be implemented by a program instructing relevant hardware of a terminal device. The program may be stored in a computer-readable storage medium. The storage medium may include a flash disk, a read-only memory (ROM), a random access memory (RAM), a magnetic disk, an optical disc, and the like.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions implemented by a computer program can be easily implemented by using corresponding hardware. Moreover, a specific hardware structure used to achieve the same function may be of various forms, for example, in a form of an analog circuit, a digital circuit, or a dedicated circuit. However, for this application, software program implementation is a better implementation in most cases. Based on such an understanding, the technical solutions of this application essentially or the part contributing to the related art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

To sum up, the foregoing embodiments are merely intended for describing the technical solutions of this application, but not for limiting this application. Although this application is described in detail with reference to the foregoing embodiments, it is to be understood by a person of ordinary skill in the art that they may still make modifications to the technical solutions described in the foregoing embodiments or make equivalent replacements to some technical features thereof, without departing from the spirit and scope of the technical solutions of the embodiments of this application.

INDUSTRIAL APPLICABILITY

In the embodiments of this application, a visual feature of a to-be-annotated image is first extracted from the to-be-annotated image through a generative adversarial network; M pieces of random noise are sequentially inputted into the generative adversarial network model; in a case that a single piece of random noise is inputted into the generative adversarial network model, determinantal point process (DPP) processing is performed on the visual feature and the single piece of random noise through the generative adversarial network model, to obtain N randomly selected tag subsets, and one distinct tag subset is selected from the N randomly selected tag subsets through the generative adversarial network model. M distinct tag subsets are outputted through the generative adversarial network model after the M pieces of random noise are inputted into the generative adversarial network model, the M tag subsets being diverse from each other. In the embodiments of this application, DPP processing may be performed on a visual feature of an image and a single piece of random noise, to output N randomly selected tag subsets, and one distinct tag subset may be selected from the N tag subsets. In a case that M pieces of random noise are inputted into a generative adversarial network model, distinct tag subsets respectively corresponding to each piece of random noise may be outputted. Therefore, a plurality of diverse and distinct tag subsets are finally generated, thus achieving a human-like image annotation effect and implementing a comprehensive description of the image.

What is claimed is:

1. A method for annotating image, the method comprising:
   extracting, by a device comprising a memory storing instructions and a processor in communication with the memory, a visual feature of an image from the image through a generative adversarial network model;
   sequentially inputting, by the device, M pieces of random noise into the generative adversarial network model, M being a positive integer;
   in response to each of the M pieces of random noise being inputted into the generative adversarial network model:
      performing, by the device, a determinantal point process (DPP) on the visual feature of the image and the each random noise through the generative adversarial network model to obtain N tag subsets, N being a positive integer by:
         concatenating, by the device, a feature vector corresponding to the visual feature and a noise vector corresponding to the each random noise, to obtain a hybrid vector,
         obtaining, by the device according to a candidate tag set, a correlation function unrelated to the visual feature,
         performing, by the device, the DPP on the correlation function and the hybrid vector through the generative adversarial network model, to obtain a probability distribution function,
         performing, by the device, sequential sampling according to the probability distribution function, to obtain a current tag,
         determining, by the device by using a weighted semantic path (WSP), whether the current tag and a sampled tag that is obtained before current sampling are from the same semantic path,
         in response to determining that that the current tag and the sampled tag are from the same semantic path, discarding, by the device, the current tag and performing sampling again,
         in response to determining that that the current tag and the sampled tag are not from the same semantic path, reserving, by the device, the current tag and sampling a next tag,
         performing, by the device, the above step of performing sequential sampling until a quantity of tags obtained through sampling reaches a maximum tag quantity of a tag subset, and
         continuing, by the device, to perform sampling in a case that the quantity of tags obtained through sampling reaches the maximum tag quantity of the tag subset, until the N tag subsets are collected, and
      selecting, by the device, a distinct tag subset from the N tag subsets through the generative adversarial network model; and
   outputting, by the device, M distinct tag subsets through the generative adversarial network model after the M pieces of random noise are inputted into the generative adversarial network model, the M distinct tag subsets being diverse from each other.

2. The method according to claim 1, wherein:
   the generative adversarial network model comprises a generative network model and an adversarial network model; and
   before the extracting the visual feature of the image from the image through the generative adversarial network model, the method further comprises:
      obtaining, by the device, a sample image from a sample database,
      extracting, by the device, a sample visual feature from the sample image through the generative network model,
      performing, by the device, the DPP on the sample visual feature and a single piece of random noise through the generative network model, to obtain N sample tag sub sets,
      selecting, by the device, one distinct sample tag subset from the N sample tag subsets through the generative network model, and
      performing, by the device, alternate training on the generative network model and the adversarial network model by using the distinct sample tag subset and the sample visual feature of the image.

3. The method according to claim 2, wherein the performing alternate training on the generative network model and the adversarial network model by using the sample tag subset and the sample visual feature of the sample image comprises:
   obtaining, by the device in current training of the generative network model, a sampled tag outputted by the generative network model in previous training;
   obtaining, by the device through a reinforcement learning algorithm, a policy function used for measuring a possibility that the generative network model outputs a next tag based on the sample image and the sampled tag;
   updating, by the device, the generative network model according to a gradient value of the policy function;
   obtaining, by the device in current training of the adversarial network model, a distinct sample tag subset outputted by the generative network model on which the current training is completed; and
   performing, by the device, discrimination on the sample tag subset and the sample visual feature through the adversarial network model, and outputting a discrimination result.

4. The method according to claim 3, wherein the obtaining, through the reinforcement learning algorithm, the policy function used for measuring the possibility that the generative network model outputs the next tag based on the sample image and the sampled tag comprises:
   determining, by the device, a correlation function between the sampled tag and the sample image through the generative network model;
   obtaining, by the device, a timely reward function according to the correlation function between the sampled tag and the sample image; and
   obtaining, by the device, the policy function according to the timely reward function and a marginal probability of selecting the next tag.

5. The method according to claim 3, wherein the performing the discrimination on the sample tag subset and the sample visual feature through the adversarial network model comprises:
   vectorizing, by the device, all sample tags in the sample tag subset, to obtain a plurality of sample tag vectors;
   obtaining, by the device, correlation scores between the plurality of sample tag vectors and a feature vector corresponding to the sample visual feature; and
   obtaining, by the device, a correlation score between the sample tag subset and the visual feature of the image according to the correlation scores corresponding to the plurality of sample tag vectors.

6. The method according to claim 1, wherein the selecting the distinct tag subset from the N tag subsets through the generative adversarial network model comprises:
respectively calculating, by the device, a sum of weights corresponding to all tags in each tag subset in the N tag subsets by using the WSP, to obtain total tag weights respectively corresponding to the N tag subsets; and
selecting, by the device, a tag subset with a maximum weight as the distinct tag subset according to the total tag weights respectively corresponding to the N tag subsets.

7. An apparatus for annotating image, the apparatus comprising:
a memory storing instructions; and
a processor in communication with the memory, wherein, when the processor executes the instructions, the processor is configured to cause the apparatus to:
extract a visual feature of an image from the image through a generative adversarial network model,
sequentially input M pieces of random noise into the generative adversarial network model, M being a positive integer,
in response to each of the M pieces of random noise being inputted into the generative adversarial network model:
perform a determinantal point process (DPP) on the visual feature of the image and the each random noise through the generative adversarial network model to obtain N tag subsets, N being a positive integer by:
concatenating a feature vector corresponding to the visual feature and a noise vector corresponding to the each random noise, to obtain a hybrid vector,
obtaining, according to a candidate tag set, a correlation function unrelated to the visual feature,
performing the DPP on the correlation function and the hybrid vector through the generative adversarial network model, to obtain a probability distribution function,
performing sequential sampling according to the probability distribution function, to obtain a current tag,
determining, by using a weighted semantic path (WSP), whether the current tag and a sampled tag that is obtained before current sampling are from the same semantic path,
in response to determining that that the current tag and the sampled tag are from the same semantic path, discarding the current tag and performing sampling again,
in response to determining that that the current tag and the sampled tag are not from the same semantic path, reserving the current tag and sampling a next tag,
performing the above step of performing sequential sampling until a quantity of tags obtained through sampling reaches a maximum tag quantity of a tag subset, and
continuing to perform sampling in a case that the quantity of tags obtained through sampling reaches the maximum tag quantity of the tag subset, until the N tag subsets are collected, and
select a distinct tag subset from the N tag subsets through the generative adversarial network model, and
output M distinct tag subsets through the generative adversarial network model after the M pieces of random noise are inputted into the generative adversarial network model, the M distinct tag subsets being diverse from each other.

8. The apparatus according to claim 7, wherein,
the generative adversarial network model comprises a generative network model and an adversarial network model; and
before the processor is configured to cause the apparatus to extract the visual feature of the image from the image through the generative adversarial network model, the processor is configured to cause the apparatus to:
obtain a sample image from a sample database,
extract a sample visual feature from the sample image through the generative network model,
perform the DPP on the sample visual feature and a single piece of random noise through the generative network model, to obtain N sample tag subsets,
select one distinct sample tag subset from the N sample tag subsets through the generative network model, and
perform alternate training on the generative network model and the adversarial network model by using the distinct sample tag subset and the sample visual feature of the image.

9. The apparatus according to claim 8, wherein, when the processor is configured to cause the apparatus to perform alternate training on the generative network model and the adversarial network model by using the sample tag subset and the sample visual feature of the sample image, the processor is configured to cause the apparatus to:
obtain, in current training of the generative network model, a sampled tag outputted by the generative network model in previous training;
obtain, through a reinforcement learning algorithm, a policy function used for measuring a possibility that the generative network model outputs a next tag based on the sample image and the sampled tag;
update the generative network model according to a gradient value of the policy function;
obtain, in current training of the adversarial network model, a distinct sample tag subset outputted by the generative network model on which the current training is completed; and
perform discrimination on the sample tag subset and the sample visual feature through the adversarial network model, and outputting a discrimination result.

10. The apparatus according to claim 9, wherein, when the processor is configured to cause the apparatus to obtain, through the reinforcement learning algorithm, the policy function used for measuring the possibility that the generative network model outputs the next tag based on the sample image and the sampled tag, the processor is configured to cause the apparatus to:
determine a correlation function between the sampled tag and the sample image through the generative network model;
obtain a timely reward function according to the correlation function between the sampled tag and the sample image; and
obtain the policy function according to the timely reward function and a marginal probability of selecting the next tag.

11. The apparatus according to claim 9, wherein, when the processor is configured to cause the apparatus to perform the discrimination on the sample tag subset and the sample visual feature through the adversarial network model, the processor is configured to cause the apparatus to:
vectorize all sample tags in the sample tag subset, to obtain a plurality of sample tag vectors;
obtain correlation scores between the plurality of sample tag vectors and a feature vector corresponding to the sample visual feature; and
obtain a correlation score between the sample tag subset and the visual feature of the image according to the correlation scores corresponding to the plurality of sample tag vectors.

12. The apparatus according to claim 7, wherein, when the processor is configured to cause the apparatus to select the distinct tag subset from the N tag subsets through the generative adversarial network model, the processor is configured to cause the apparatus to:
respectively calculate a sum of weights corresponding to all tags in each tag subset in the N tag subsets by using the WSP, to obtain total tag weights respectively corresponding to the N tag subsets; and
select a tag subset with a maximum weight as the distinct tag subset according to the total tag weights respectively corresponding to the N tag subsets.

13. A non-transitory computer readable storage medium storing computer readable instructions, wherein, the computer readable instructions, when executed by a processor, are configured to cause the processor to perform:
extracting a visual feature of an image from the image through a generative adversarial network model;
sequentially inputting M pieces of random noise into the generative adversarial network model, M being a positive integer;
in response to each of the M pieces of random noise being inputted into the generative adversarial network model:
performing a determinantal point process (DPP) on the visual feature of the image and the each random noise through the generative adversarial network model to obtain N tag subsets, N being a positive integer by:
concatenating a feature vector corresponding to the visual feature and a noise vector corresponding to the each random noise, to obtain a hybrid vector,
obtaining, according to a candidate tag set, a correlation function unrelated to the visual feature,
performing the DPP on the correlation function and the hybrid vector through the generative adversarial network model, to obtain a probability distribution function,
performing sequential sampling according to the probability distribution function, to obtain a current tag,
determining, by using a weighted semantic path (WSP), whether the current tag and a sampled tag that is obtained before current sampling are from the same semantic path,
in response to determining that that the current tag and the sampled tag are from the same semantic path, discarding the current tag and performing sampling again,
in response to determining that that the current tag and the sampled tag are not from the same semantic path, reserving the current tag and sampling a next tag,
performing the above step of performing sequential sampling until a quantity of tags obtained through sampling reaches a maximum tag quantity of a tag subset, and
continuing to perform sampling in a case that the quantity of tags obtained through sampling reaches the maximum tag quantity of the tag subset, until the N tag subsets are collected, and
selecting a distinct tag subset from the N tag subsets through the generative adversarial network model; and
outputting M distinct tag subsets through the generative adversarial network model after the M pieces of random noise are inputted into the generative adversarial network model, the M distinct tag subsets being diverse from each other.

14. The non-transitory computer readable storage medium according to claim 13, wherein,
the generative adversarial network model comprises a generative network model and an adversarial network model; and
before the computer readable instructions are configured to cause the processor to perform extracting the visual feature of the image from the image through the generative adversarial network model, the computer readable instructions are configured to cause the processor to perform:
obtaining a sample image from a sample database,
extracting a sample visual feature from the sample image through the generative network model,
performing the DPP on the sample visual feature and a single piece of random noise through the generative network model, to obtain N sample tag subsets,
selecting one distinct sample tag subset from the N sample tag subsets through the generative network model, and
performing alternate training on the generative network model and the adversarial network model by using the distinct sample tag subset and the sample visual feature of the image.

15. The non-transitory computer readable storage medium according to claim 14, wherein, when the computer readable instructions are configured to cause the processor to perform alternate training on the generative network model and the adversarial network model by using the sample tag subset and the sample visual feature of the sample image, the computer readable instructions are configured to cause the processor to perform:
obtaining, in current training of the generative network model, a sampled tag outputted by the generative network model in previous training;
obtaining, through a reinforcement learning algorithm, a policy function used for measuring a possibility that the generative network model outputs a next tag based on the sample image and the sampled tag;
updating the generative network model according to a gradient value of the policy function;
obtaining, in current training of the adversarial network model, a distinct sample tag subset outputted by the generative network model on which the current training is completed; and
performing discrimination on the sample tag subset and the sample visual feature through the adversarial network model, and outputting a discrimination result.

16. The non-transitory computer readable storage medium according to claim 15, wherein, when the computer readable instructions are configured to cause the processor to perform obtaining, through the reinforcement learning algorithm, the policy function used for measuring the possibility that the generative network model outputs the next tag based on the sample image and the sampled tag, the computer readable instructions are configured to cause the processor to perform:
- determining a correlation function between the sampled tag and the sample image through the generative network model;
- obtaining a timely reward function according to the correlation function between the sampled tag and the sample image; and
- obtaining the policy function according to the timely reward function and a marginal probability of selecting the next tag.

17. The non-transitory computer readable storage medium according to claim 15, wherein, when the computer readable instructions are configured to cause the processor to perform the discrimination on the sample tag subset and the sample visual feature through the adversarial network model, the computer readable instructions are configured to cause the processor to perform:
- vectorizing all sample tags in the sample tag subset, to obtain a plurality of sample tag vectors;
- obtaining correlation scores between the plurality of sample tag vectors and a feature vector corresponding to the sample visual feature; and
- obtaining a correlation score between the sample tag subset and the visual feature of the image according to the correlation scores corresponding to the plurality of sample tag vectors.

18. The non-transitory computer readable storage medium according to claim 13, wherein:
when the computer readable instructions are configured to cause the processor to perform selecting the distinct tag subset from the N tag subsets through the generative adversarial network model, the computer readable instructions are configured to cause the processor to perform:
- respectively calculating a sum of weights corresponding to all tags in each tag subset in the N tag subsets by using the WSP, to obtain total tag weights respectively corresponding to the N tag subsets, and
- selecting a tag subset with a maximum weight as the distinct tag subset according to the total tag weights respectively corresponding to the N tag subsets.

* * * * *